(12) United States Patent
Horne

(10) Patent No.: US 9,645,721 B2
(45) Date of Patent: May 9, 2017

(54) DEVICE INPUT MODES WITH CORRESPONDING COVER CONFIGURATIONS

(71) Applicant: Apple Inc., Cupertino, CA (US)

(72) Inventor: Stephen C. Horne, Austin, TX (US)

(73) Assignee: Apple Inc., Cupertino, CA (US)

( * ) Notice: Subject to any disclaimer, the term of this patent is extended or adjusted under 35 U.S.C. 154(b) by 139 days.

(21) Appl. No.: 13/946,756

(22) Filed: Jul. 19, 2013

(65) Prior Publication Data

US 2015/0026623 A1   Jan. 22, 2015

(51) Int. Cl.
| | | |
|---|---|---|
| *G06F 3/00* | (2006.01) | |
| *G06F 3/0484* | (2013.01) | |
| *G06F 1/16* | (2006.01) | |
| *G06F 3/0488* | (2013.01) | |
| *G06F 3/0482* | (2013.01) | |

(52) U.S. Cl.
CPC ........ *G06F 3/04847* (2013.01); *G06F 1/1626* (2013.01); *G06F 1/1677* (2013.01); *G06F 3/0482* (2013.01); *G06F 3/04883* (2013.01); *G06F 3/04886* (2013.01); *G06F 2200/1634* (2013.01); *G06F 2203/04803* (2013.01)

(58) Field of Classification Search
CPC ....................................... G06F 3/0481–3/0489
USPC ....................................................... 715/863
See application file for complete search history.

(56) References Cited

U.S. PATENT DOCUMENTS

| | | |
|---|---|---|
| 6,535,199 B1 | 3/2003 | Canova, Jr. et al. |
| 6,870,732 B2 | 3/2005 | Huang et al. |
| 7,025,274 B2 | 4/2006 | Solomon et al. |
| 7,069,056 B2 | 6/2006 | Iwata et al. |
| 7,205,475 B2 | 4/2007 | Jiang et al. |
| 7,288,934 B1 | 10/2007 | Ikarashi et al. |
| 7,492,583 B2 | 2/2009 | Lv |

(Continued)

FOREIGN PATENT DOCUMENTS

| | | |
|---|---|---|
| AU | 2011100423 A4 | 6/2011 |
| CN | 101957640 A | 1/2011 |

(Continued)

OTHER PUBLICATIONS

International Search Report and Written Opinion mailed Oct. 21, 2014 for PCT Application No. PCT/US2014/046470.

(Continued)

*Primary Examiner* — Steven B Theriault
(74) *Attorney, Agent, or Firm* — Downey Brand LLP

(57) ABSTRACT

A method performed by a tablet device having a touch screen display and at least one sensor coupled to a processor includes using the at least one sensor to determine that a cover attached to the tablet device is in a partially open configuration, receiving a touch input gesture from an uncovered portion of the touch screen display when the cover is in the partially open configuration, identifying, based upon a type of the input gesture, an operating parameter of the device, determining, based upon the input gesture, a setting value for the operating parameter, and altering the operating parameter of the device based upon the setting value. For example, the gesture can be a swipe, the operating parameter can be a brightness of the display, and altering the operating parameter can include adjusting the brightness of the display based upon the value.

22 Claims, 17 Drawing Sheets

(56) References Cited

U.S. PATENT DOCUMENTS

| | | | |
|---|---|---|---|
| 7,541,907 B2 | 6/2009 | Wang et al. | |
| 7,639,479 B2 | 12/2009 | Chuang et al. | |
| 7,688,315 B1 | 3/2010 | Gettemy et al. | |
| 7,692,667 B2 | 4/2010 | Nguyen et al. | |
| 7,907,394 B2 | 3/2011 | Richardson et al. | |
| 7,986,420 B2 | 7/2011 | Harris | |
| 8,009,158 B2 | 8/2011 | Chen et al. | |
| 8,030,914 B2 | 10/2011 | Alameh et al. | |
| 8,143,982 B1 | 3/2012 | Lauder et al. | |
| 8,242,868 B2 | 8/2012 | Lauder et al. | |
| 8,253,518 B2 | 8/2012 | Lauder et al. | |
| 8,264,310 B2 | 9/2012 | Lauder et al. | |
| 8,289,115 B2 | 10/2012 | Cretella, Jr. et al. | |
| 8,390,411 B2 | 3/2013 | Lauder et al. | |
| 8,416,217 B1* | 4/2013 | Eriksson | G06F 1/1616 178/18.09 |
| 8,570,736 B2 | 10/2013 | McClure et al. | |
| 8,587,939 B2 | 11/2013 | McClure et al. | |
| 8,624,695 B2 | 1/2014 | Cretella, Jr. et al. | |
| 8,707,215 B2* | 4/2014 | Hamadene | G06F 3/04883 345/173 |
| 8,724,300 B2* | 5/2014 | Smith et al. | 361/679.01 |
| 8,847,979 B2* | 9/2014 | Smith et al. | 345/619 |
| 8,863,038 B2 | 10/2014 | King et al. | |
| 8,947,874 B2* | 2/2015 | Andre et al. | 361/679.55 |
| 8,964,379 B2* | 2/2015 | Rihn | G06F 1/1616 335/288 |
| 9,035,872 B2 | 5/2015 | Brown et al. | |
| 9,086,844 B2* | 7/2015 | Blue | G06F 1/1626 |
| 9,125,272 B2 | 9/2015 | Huang | |
| 9,250,788 B2* | 2/2016 | Whiddett | G06F 3/04883 |
| 2002/0103616 A1* | 8/2002 | Park | G06F 1/3203 702/150 |
| 2003/0008679 A1 | 1/2003 | Iwata et al. | |
| 2003/0020685 A1 | 1/2003 | Richley et al. | |
| 2003/0038786 A1 | 2/2003 | Nguyen et al. | |
| 2003/0222149 A1 | 12/2003 | Solomon et al. | |
| 2004/0012953 A1 | 1/2004 | Clemente et al. | |
| 2004/0203502 A1 | 10/2004 | Dietrich et al. | |
| 2004/0248621 A1 | 12/2004 | Schon | |
| 2005/0179653 A1 | 8/2005 | Hamon | |
| 2005/0286212 A1 | 12/2005 | Brignone et al. | |
| 2006/0250320 A1* | 11/2006 | Fuller | G06F 1/1616 345/1.1 |
| 2006/0256090 A1 | 11/2006 | Huppi | |
| 2006/0284852 A1 | 12/2006 | Hofmeister et al. | |
| 2007/0075965 A1* | 4/2007 | Huppi | G06F 3/0418 345/156 |
| 2008/0024453 A1 | 1/2008 | Webb et al. | |
| 2008/0039009 A1 | 2/2008 | Symons et al. | |
| 2008/0046625 A1 | 2/2008 | Spano et al. | |
| 2008/0072896 A1 | 3/2008 | Setzer et al. | |
| 2008/0165141 A1* | 7/2008 | Christie | G06F 3/044 345/173 |
| 2009/0153289 A1* | 6/2009 | Hope et al. | 340/5.1 |
| 2009/0195497 A1* | 8/2009 | Fitzgerald et al. | 345/156 |
| 2009/0251406 A1* | 10/2009 | Seibert et al. | 345/156 |
| 2009/0256817 A1 | 10/2009 | Perlin et al. | |
| 2009/0265671 A1* | 10/2009 | Sachs | G06F 3/017 715/863 |
| 2009/0314400 A1 | 12/2009 | Liu | |
| 2009/0327974 A1* | 12/2009 | Abanami | G06F 3/03547 715/863 |
| 2010/0001961 A1* | 1/2010 | Dieterle | G06F 3/04883 345/173 |
| 2010/0045628 A1 | 2/2010 | Gettemy et al. | |
| 2010/0060593 A1 | 3/2010 | Krah | |
| 2010/0097322 A1* | 4/2010 | Hu et al. | 345/173 |
| 2010/0117629 A1 | 5/2010 | Lombardi et al. | |
| 2010/0149090 A1* | 6/2010 | Morris | H04L 67/42 345/156 |
| 2010/0156676 A1* | 6/2010 | Mooring et al. | 341/20 |
| 2010/0227640 A1 | 9/2010 | Kim et al. | |
| 2010/0245221 A1 | 9/2010 | Khan | |
| 2010/0283742 A1 | 11/2010 | Lam | |
| 2011/0039603 A1 | 2/2011 | Kim et al. | |
| 2011/0043444 A1 | 2/2011 | Pun | |
| 2011/0080349 A1* | 4/2011 | Holbein | G06F 1/3203 345/173 |
| 2011/0090626 A1* | 4/2011 | Hoellwarth et al. | 361/679.01 |
| 2011/0122594 A1 | 5/2011 | Griffin | |
| 2011/0147398 A1 | 6/2011 | Ahee et al. | |
| 2011/0153739 A1 | 6/2011 | McCoy | |
| 2011/0154268 A1* | 6/2011 | Trent, Jr. | G06F 3/04883 715/863 |
| 2011/0173204 A1* | 7/2011 | Murillo | G06F 3/017 707/741 |
| 2011/0192857 A1 | 8/2011 | Rothbaum et al. | |
| 2011/0210834 A1* | 9/2011 | Pasquero | G06F 3/04883 340/407.1 |
| 2011/0241974 A1 | 10/2011 | Manning | |
| 2011/0242043 A1* | 10/2011 | Yarvis | G06F 1/3215 345/174 |
| 2011/0260976 A1 | 10/2011 | Larsen et al. | |
| 2011/0273819 A1 | 11/2011 | Sokola et al. | |
| 2011/0297564 A1 | 12/2011 | Kim et al. | |
| 2011/0303741 A1 | 12/2011 | Bolton et al. | |
| 2011/0316655 A1 | 12/2011 | Mehraban et al. | |
| 2012/0013552 A1* | 1/2012 | Ahn | 345/173 |
| 2012/0019493 A1* | 1/2012 | Barnhoefer | H05B 33/0851 345/207 |
| 2012/0019674 A1 | 1/2012 | Ohnishi et al. | |
| 2012/0038570 A1 | 2/2012 | Delaporte | |
| 2012/0066865 A1* | 3/2012 | Lauder | G06F 1/1626 16/382 |
| 2012/0066873 A1* | 3/2012 | Lauder et al. | 24/303 |
| 2012/0068798 A1 | 3/2012 | Lauder et al. | |
| 2012/0069502 A1* | 3/2012 | Lauder et al. | 361/679.01 |
| 2012/0072167 A1* | 3/2012 | Cretella et al. | 702/150 |
| 2012/0098755 A1 | 4/2012 | Lin et al. | |
| 2012/0109455 A1 | 5/2012 | Newman et al. | |
| 2012/0194308 A1 | 8/2012 | Lauder et al. | |
| 2012/0194448 A1* | 8/2012 | Rothkopf | A45C 13/002 345/173 |
| 2012/0194997 A1* | 8/2012 | McClure et al. | 361/679.55 |
| 2012/0231847 A2* | 9/2012 | Dodge | G06F 3/04883 455/566 |
| 2012/0235930 A1* | 9/2012 | Lazaridis et al. | 345/173 |
| 2102/0231847 * | 9/2012 | Dodge et al. | 455/566 |
| 2012/0260220 A1* | 10/2012 | Griffin | 715/863 |
| 2012/0308981 A1* | 12/2012 | Libin et al. | 434/362 |
| 2013/0021266 A1 | 1/2013 | Selim | |
| 2013/0076614 A1* | 3/2013 | Ive | G06F 1/1677 345/156 |
| 2013/0088431 A1 | 4/2013 | Ballagas et al. | |
| 2013/0127724 A1 | 5/2013 | Liu | |
| 2013/0141351 A1* | 6/2013 | Aisaka | G09G 5/10 345/173 |
| 2013/0149964 A1 | 6/2013 | Kreiner | |
| 2013/0166790 A1 | 6/2013 | Lee et al. | |
| 2013/0187894 A1* | 7/2013 | Ladouceur et al. | 345/176 |
| 2013/0214887 A1 | 8/2013 | Lauder et al. | |
| 2013/0215061 A1* | 8/2013 | Rydenhag et al. | 345/173 |
| 2013/0222323 A1* | 8/2013 | McKenzie | 345/174 |
| 2013/0227495 A1* | 8/2013 | Rydenhag et al. | 715/863 |
| 2013/0233762 A1 | 9/2013 | Balaji et al. | |
| 2013/0249806 A1* | 9/2013 | Crisan | 345/173 |
| 2013/0278566 A1* | 10/2013 | Aldana | 345/204 |
| 2013/0328825 A1 | 12/2013 | Brown et al. | |
| 2013/0328917 A1* | 12/2013 | Zambetti et al. | 345/620 |
| 2014/0043748 A1 | 2/2014 | Sartee et al. | |
| 2014/0208333 A1* | 7/2014 | Beals | G06F 9/542 719/318 |
| 2014/0332441 A1* | 11/2014 | Jayetileke et al. | 206/774 |
| 2014/0333431 A1* | 11/2014 | Abdelsamie et al. | 340/539.11 |
| 2014/0362506 A1 | 12/2014 | Whitt, III et al. | |

(56) References Cited

U.S. PATENT DOCUMENTS

| | | | | |
|---|---|---|---|---|
| 2014/0368422 | A1* | 12/2014 | Gupta | G06F 3/0304 345/156 |
| 2015/0077372 | A1 | 3/2015 | Smith et al. | |
| 2015/0154935 | A1* | 6/2015 | Won | |

FOREIGN PATENT DOCUMENTS

| | | |
|---|---|---|
| CN | 102147643 A | 8/2011 |
| CN | 102156510 A | 8/2011 |
| CN | 102261597 A | 11/2011 |
| EP | 2431835 A2 | 3/2012 |
| KR | 20120032944 A | 4/2012 |
| TW | 200914914 A | 4/2009 |
| TW | 201325387 A | 6/2013 |
| WO | WO03103174 A1 | 12/2003 |
| WO | WO2010028405 A1 | 3/2010 |
| WO | WO2012036710 | 3/2012 |
| WO | WO2012036891 A2 | 3/2012 |
| WO | WO2012106216 A2 | 8/2012 |

OTHER PUBLICATIONS

Dutch patent application No. 2013177—Search Report dated Mar. 30, 2015.
Chinese Application for Invention No. 201210586186.4—First Office Action dated Aug. 12, 2015.
Anonymous: "iPad 2 Smart Cover Teardown—iFixit". Mar. 16, 2011, retrieved from the Internet: URL:https://www.ifixit.com/Teardown/Ipad+ 2+Smart+Cover+ Teardown/5089 (retrieved on Dec. 15, 2014).
European Patent Application No. 12836724.0—Supplementary European Search Report dated Jan. 8, 2015.
CN201220739140.7—Chinese Office Action mailed Apr. 9, 2013.
PCT/US2012/057032—International Search Report and Written Opinion mailed Mar. 29, 2013.
"Cloak 2,"Quirky Incorporated, 2011.
"Printechnologics," www.printechnologics.com, 2011.
Miscrosoft, Window Media Player 11 in Wikipedia 2006.
"Kayla Knight, "Responsive Web Design: What It Is and How To Use It", Jan. 12, 2011,http://www.smashingmagazine.com/2011/01/12/guidelines-for-responsive-web-design/".
International Search Report and Written Opinion mailed Aug. 14, 2013 in PCT/US2012/054668.
International Search Report and Written Opinion mailed Nov. 13, 2013 in PCT/US2013/052793.
Taiwanese Patent Application No. 102120404—Office Action dated Dec. 3, 2015.
European Application No. 13171099.8—Search Report dated Apr. 12, 2016.
Taiwanese Patent Application No. 103124156—Office Action and Search Report dated Jun. 1, 2016.
U.S. Appl. No. 14/497,185—Office Action dated Apr. 14, 2016.
U.S. Appl. No. 13/247,942—Office Action dated Jun. 7, 2016.
Chinese Application for Invention No. 201310339083.2—First Office Action dated Feb. 3, 2016.
European Patent Application No. 12836724.0—Office Action dated Mar. 14, 2016.

* cited by examiner

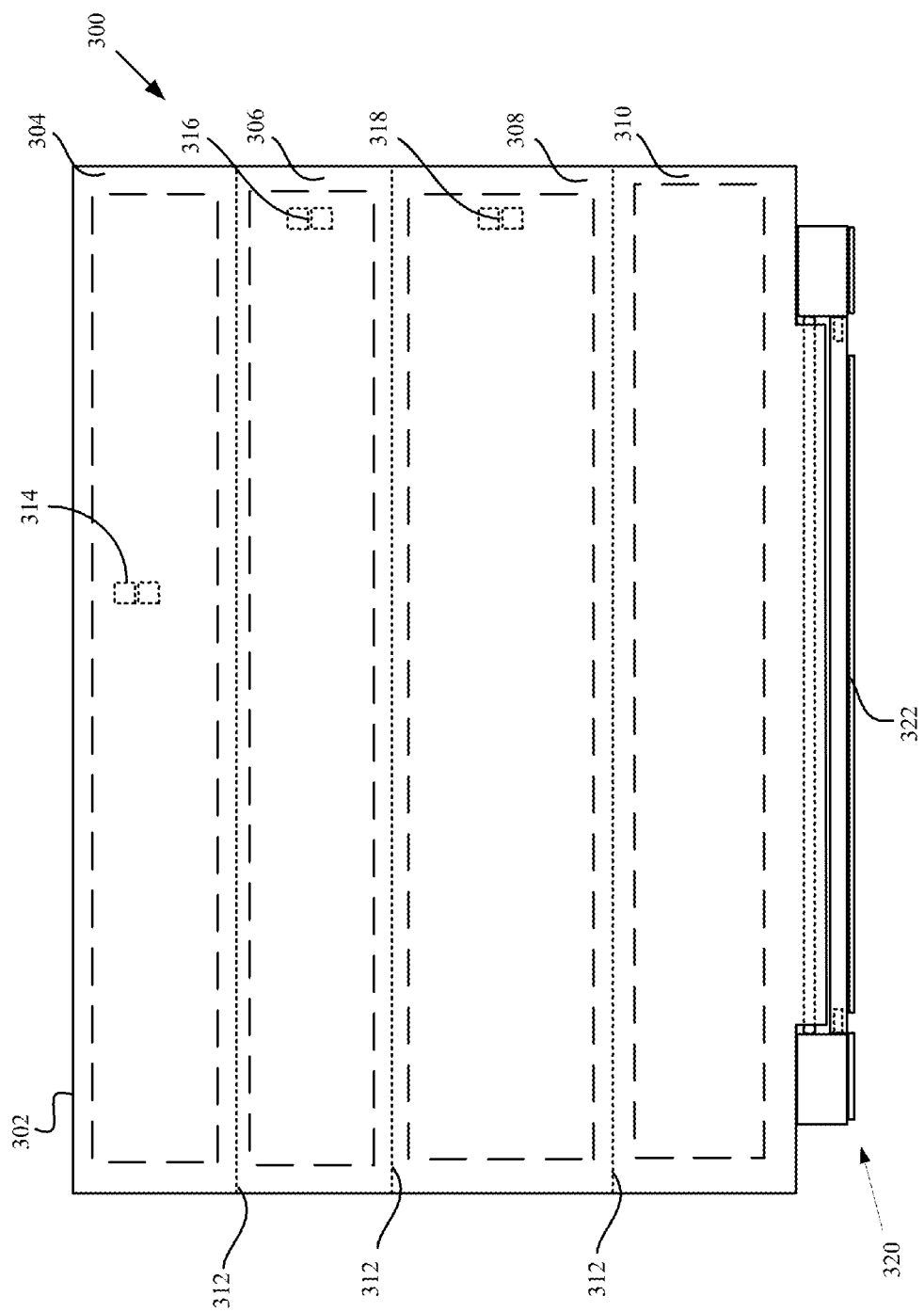

DEVICE INPUT MODES WITH CORRESPONDING COVER CONFIGURATIONS

FIELD OF THE DESCRIBED EMBODIMENTS

The described embodiments generally relate to portable electronic devices and associated accessory devices. More particularly, the present embodiments describe an electronic device configured to perform defined operations in accordance with input received by a sensor and a spatial relationship between the device and a foldable accessory device attached thereto.

DESCRIPTION OF THE RELATED ART

Recent advances in portable computing include the introduction of hand held electronic devices and computing platforms along the lines of the iPad™ tablet manufactured by Apple Inc. of Cupertino, Calif. These handheld computing devices can be configured such that a substantial portion of the electronic device takes the form of a touch screen display used for presenting visual content. Generally, information is displayed on the screen, and user input is received by a touch sensor that overlays a display portion of the screen and enables users to select objects displayed on the screen by touching the screen at or near the locations of the objects. To prevent receiving unintentional or unauthorized user input, these devices can have a lock mode, in which access to the device's features and resources is restricted until a particular input is received by the touch sensor. In lock mode, the screen displays one or more images that the user can touch to unlock the device or initiate an authentication process. For example, a device can display an image such as an icon in a particular location on the screen, and require that the user touch the location of the icon to gain access to other features and resources of the device. However, a user can control the speaker volume of the device using physical volume control buttons or switches, without unlocking the device. Such control of device features without unlocking the device increases user convenience, but is restricted to a very small number of features, since handheld computing devices often have few physical button or switches.

SUMMARY OF THE DESCRIBED EMBODIMENTS

This paper describes various embodiments that relate to a system, method, and apparatus for controlling certain features of an electronic device in accordance with input received from a touch screen when certain conditions are true, such as a protective cover being in a partially-open configuration, user input being continuously received since the cover was opened, or the like. The device's ease of use can be increased by enabling access to certain resources or features without requiring the user to unlock the device.

An electronic device having a touch screen display, a movable cover, a sensor, and a processor coupled to the display and sensor is described. Sensors can be embedded in the device to determine that a cover attached to the device is in a partially open configuration, in which a portion of the display is covered and another portion is exposed. A user can touch the screen in a motion referred to as an input gesture. Examples of input gestures include touching a point on the screen, moving a finger across the screen in a swipe gesture, touching the screen simultaneously with two fingers and moving the fingers towards each other or away from each other in a pinch or zoom gesture, and so on. When an input gesture is received from the touch screen display and the cover is partially open, an operating parameter of the device can be changed in accordance with the input gesture. The operating parameter being altered can be, for example, display brightness.

In one or more embodiments, user interfaces presented on a touch screen display of a device can be changed as size of the region exposed by the cover changes in response to movement or folding of portions of the cover. The different user interfaces can present different levels of detail of an application's data, such as text, image, audio, or video content. In one aspect, a first user interface displaying a first content item, e.g., application data, can be presented on a first region of a touch screen display when a foldable a cover is in a first partially open configuration that exposes the first region. The first partially open configuration can occur, for example, when a first segment of the cover has been folded away from the display. A second user interface, such as an expanded version of the first user interface showing additional information and having additional features in addition to the first content item, can be presented in an expanded region of the display that includes the first region and a second region adjacent to the first region when the cover is in a second partially open configuration that exposes the expanded region. The second partially open configuration can occur, for example, when a second segment of the cover has been folded away from the display. The first user interface can be, for example, a first email interface configured to display information about an email message, and the second user interface can be a second email interface configured to display information about a plurality of email messages, including the message displayed in the first interface, and content of at least one email message.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The invention will be readily understood by the following detailed description in conjunction with the accompanying drawings, wherein like reference numerals designate like structural elements, and in which:

FIG. 3 shows a top view of an embodiment of a segmented cover.

DETAILED DESCRIPTION OF SELECTED EMBODIMENTS

Figure 1:
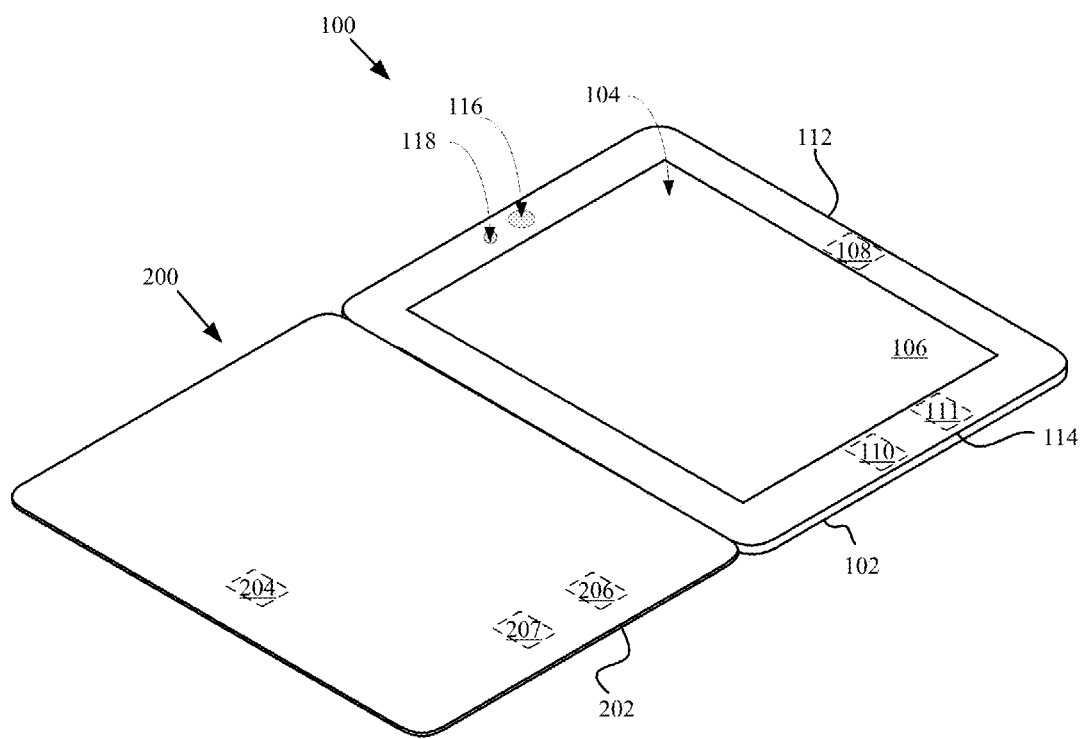
FIG. 1 shows a closed configuration of the cooperating system formed by the tablet device and protective cover.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

An electronic device having a touch screen display, a movable cover, a sensor, and a processor coupled to the display and sensor is described. In one embodiment, sensors can be embedded in the device to determine that a cover attached to the device is in a partially open configuration, in which a portion of the display is covered and another portion is exposed. A user can touch the screen in a motion referred to as an input gesture. Examples of input gestures include touching a point on the screen, moving a finger across the screen in a swipe gesture, touching the screen simultaneously with two fingers and moving the fingers towards each other or away from each other in a pinch or zoom gesture, and so on.

When an input gesture is received from the touch screen display and the cover is partially open, an operating parameter of the device can be changed in accordance with the input gesture. The operating parameter being altered can be, for example, display brightness. In one example, the brightness can be increased in response to a swipe in a first direction, and decrease in response to a swipe in a second direction opposite the first direction. Properties of the gesture, such as the length of the swipe gesture, can be used to determine a setting value for the parameter. For example, if the gesture is a swipe between two points, the brightness can be set proportionally to the distance between the two points. Different types of gestures can correspond to different operating parameters so that the type of the gesture can be used to identify the operating parameter to be altered. For example, a vertical swipe or a pinch and zoom gesture can alter a different parameter, such as speaker volume. A circular swipe can be used to toggle an orientation lock between locked and unlocked values. A lookup table or similar mapping data structure can be defined to store an association between input gesture types and operating parameters.

As the device waits for and receives touch input, the display can remain blank or can produce visual feedback indicating the change in the parameter, e.g., by changing brightness in accordance with the brightness parameter as the input gesture is received. A user interface can optionally be displayed, with input controls that the user can adjust via the touch screen to set values of operating parameters associated with the controls. In one example, the visual feedback can be produced by displaying a solid color, pattern, or image, without necessarily displaying any user interface components, so that the user can touch the screen at any exposed portion to cause the parameter to be changed, without necessarily touching a location of a user interface component at a particular location on the display.

In one embodiment, a user interface can be displayed in the exposed portion of the display, and the user interface can present at least one parameter adjustment control that is linked to an associated parameter. Touch input can be used to select or move a portion of the parameter adjustment control to set the associated parameter to a value based on a state of the control (e.g., a numeric value that represents a slider control position). In another embodiment, the user interface can be displayed only after a determined time period has elapsed since the partially open configuration was detected, so that the display is not activated immediately upon partially opening the cover. If no input is received after the determined time period, however, the display is activated and the user interface is displayed, thereby informing the user of the controls available. In another embodiment, a time threshold can be applied to the user interface, so that the user interface is active for a period of time, but becomes inactive after the period of time has passed.

The cover can be a foldable flap having multiple segments, one of which can be lifted from the display while another covers the display to produce the partially open configuration. Multiple sensors can be used, so that, for example, the partially open configuration can be detected when with a first sensor does not detect an associated first segment of the cover while a second segment does detect a second segment of the cover.

In one or more embodiments, a user interface presented on a touch screen display of a device can be changed as the size of the region exposed by the cover changes in response to movement or folding of portions of the cover. The different user interfaces can present different levels of detail of an application's data, such as text, image, audio, or video content. In one aspect, a first user interface displaying a first content item, e.g., application data, can be presented on a first region of a touch screen display when a foldable a cover is in a first partially open configuration that exposes the first region. The first partially open configuration can occur, for example, when a first segment of the cover has been folded away from the display. A second user interface, such as an expanded version of the first user interface showing additional information and having additional features in addition to the first content item, can be presented in an expanded region of the display that includes the first region and a second region adjacent to the first region when the cover is in a second partially open configuration that exposes the expanded region. The second partially open configuration can occur, for example, when a second segment of the cover has been folded away from the display.

The first user interface can be, for example, a first email interface configured to display information about an email message, and the second user interface can be a second email interface configured to display information about a plurality of email messages, including the message displayed in the first interface, and content of at least one email message. The user interfaces can present different levels of detail of an application's data, such as text, image, audio, or video content. In another example, the user interfaces can present different portions of an application's data. In yet another example, the user interfaces can present components of different applications, e.g., the first interface can present summary data such as email message headers or media titles, whereas the second interface can present detailed data from a particular one of the applications represented in the first user interface.

In one embodiment, the cover is in the first partially-open configuration when a first segment of the cover is folded away from the first region of the display, a second segment of the cover adjacent to the first segment is in contact with the second region, and a third segment of the cover opposite the first segment and adjacent to the second segment is in contact with a third region of the display adjacent to the second region and opposite the first region. The cover is in the second partially-open configuration when the first and second segments of the cover are folded away from the second region of the display, and a third region of the display remains covered by a third segment of the cover. The determination of whether the cover is folded away from or in contact with the display can be made using at least one sensor, as described below.

An electronic device responsive to a spatial relationship between the electronic device and a moveable accessory device attached thereto is described. In one embodiment, the electronic device can take the form of a tablet device that can include at least a touch screen display configured to present visual content and receive input responsive to being touched, and at least one sensor. In one embodiment, the moveable accessory device can take the form of a cover or flap that can be pivotally attached to the tablet device, the flap having a size and shape in accordance with the display. The electronic device can determine a spatial relationship between the flap and the display using the sensor.

The flap can be configured to include any number of foldable segments. For example, the flap can include two segments or the flap can include three or more segments. For example, when the flap includes three or more segments, the electronic device can determine a spatial relationship between the first, second, and third segments and the display using a first, second, and third sensor disposed in the tablet device. The first, second, and third sensors can cooperate with each other by detecting magnetic fields generated by magnets and based upon the detection, a signal is provided to the tablet device that alters a current operating state of the tablet device in accordance with the detected spatial relationship between the segments and the display.

In one embodiment, when the first sensor detects the magnetic field from the first magnet in the first segment, then the tablet device disables the display. However, when the first sensor does not detect the magnetic field from the first magnet and the second sensor does detect the magnetic field from the second magnet, then the tablet device operates in a first peek mode by displaying visual content only in a first viewable portion of the display. The first viewable portion of the display corresponding to that portion of the display covered by the first segment when the flap fully covers the display in a closed configuration. In one embodiment, when the first sensor and the second sensor do not detect magnetic fields from the first magnet and the second magnet, respectively, and the third sensor does detect a magnetic field from the third magnet, and then the tablet device operates in a second peek mode in which a second viewable portion of the display presents visual content. The second viewable portion of the display corresponds to that portion of the display covered by the first and second segments when the flap covers the entire display in the closed configuration.

In one embodiment, the tablet device can present visual content in accordance with the current operating state of the tablet device. For example, in the first peek mode, the tablet device can operate to present visual content in only the first viewable portion of the display. Furthermore, the tablet device can execute an application in accordance with the current operating state of the tablet device. For example, in the first peek mode, the tablet device can execute a mail application by presenting visual content only in the first viewable portion of the display. The visual content can take the form of an icon indicating that unopened mail is available for viewing. The tablet device transitions from the first peek mode to the second peek mode, the tablet device can execute the mail application in accordance with the second peek mode. For example, in the first peek mode, the mail application can present a snippet of an email (such as a subject line). However, when the tablet device transitions from the first to the second peek mode by the second segment being lifted from the display (rendering the second magnet not detected by the second sensor), the tablet device can change the displayed email snippet (the subject line, for example) to a larger portion of the email message in accordance with the increased amount of display that is viewable. For example, if sufficient display resources are available, the entire email message can be displayed or the email message can be scrolled using, for example, a scrolling finger gesture applied to a touch sensitive layer corresponding to the viewable portion of the display. In another example, there can be a third peek mode having a viewable portion that is smaller than the full size of the display, but larger than the viewable portion of the second peek mode. In the third peek mode, additional email-related information can be displayed, such as a list of email messages, in addition to one or more entire email messages or scrollable portions of email messages, while still displaying less information than is displayed in the standard mode of operation.

In one embodiment, control elements used to control applications can be presented in the viewable area. The control elements can include elements of a user interface that can be used to control volume; media item selection, video selection, and so forth. In one embodiment, the tablet device can present visual media in the viewable area. The visual media can take the form of still images. The visual media can also take the form or moving images and/or video. In one embodiment, the visual media can be presented in accordance with the current operating state of the tablet device. For example, when the display is completely uncovered, then an image (or video) can be presented in a native format and or aspect ratio. However, when the tablet device transitions from a standard operating mode (with the display completely uncovered) to a first peek operating mode, then the image (or video) can be presented in accordance with the first viewable portion of the display. For example, the aspect ratio and or resolution of the image (or video) can be altered to fit the available display area. In another example, in a first peek mode with a relatively small viewable portion, the audio content of a video can be played through the device's speakers. In a second peek mode with a larger viewable portion, the video images can be displayed in a reduced-size format that fits the larger viewable portion.

These and other embodiments are discussed below with reference to FIGS. 1-15. For example, embodiments that involve changing the presentation and elements of user interfaces as movement of the cover causes the size of the viewable area to change are described in further detail below. However, those skilled in the art will readily appreciate that the detailed description given herein with respect to these figures is for explanatory purposes only and should not be construed as limiting.

Figure 2:
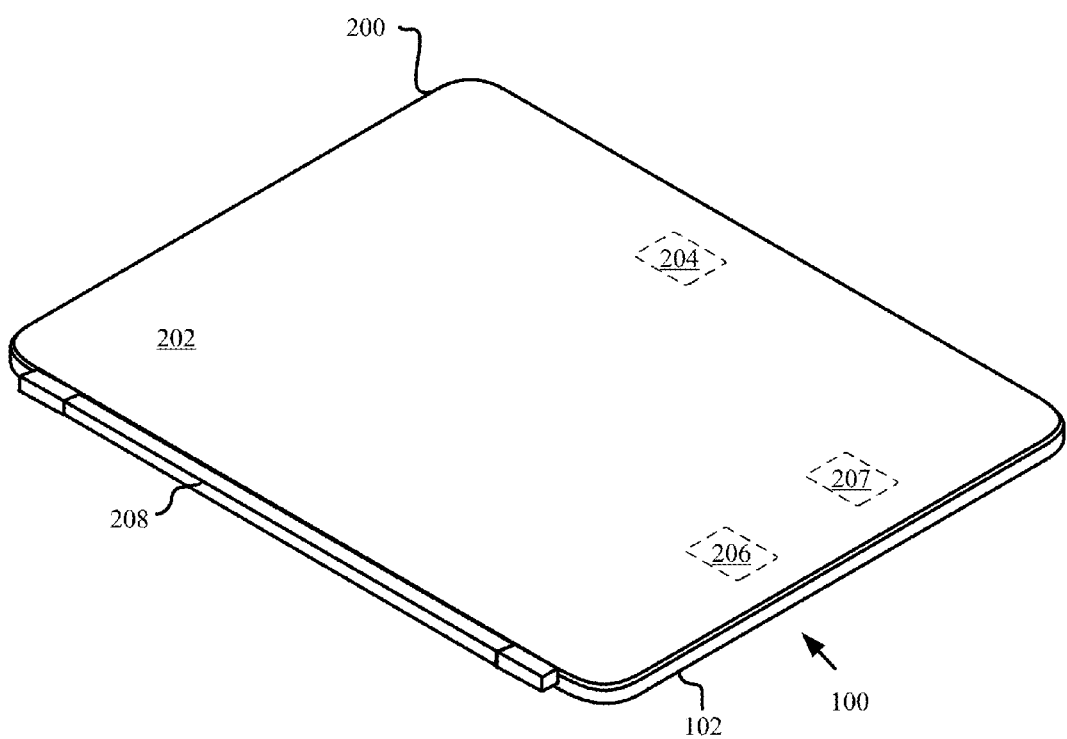
FIG. 2 shows an open configuration of the cooperating system shown in FIG. 1.

The remainder of this discussion will describe particular embodiments of electronic devices that can operate in accordance with a spatial relationship between the device and an accessory device attached thereto. In particular, FIG. 1 and FIG. 2 show electronic device 100 presented in terms of tablet device 100 and accessory device 200 in the form of foldable cover 200. FIG. 1 shows a perspective view of tablet device 100 and foldable cover 200 in an open configuration whereas FIG. 2 shows a perspective view of tablet device 100 and foldable cover 200 in a closed configuration. Tablet device 100 can take the form of a tablet computing device such as the iPad™ manufactured by Apple Inc. of Cupertino, Calif.

FIG. 1 shows foldable cover 200 in an open configuration. Tablet device 100 can include housing 102 that can enclose and support a magnetic attachment feature that provides magnetic surface suitable for magnetically attaching foldable cover 200 and tablet device 100. Housing 102 can also enclose and support internally various structural and electrical components (including integrated circuit chips and other circuitry) to provide computing operations for tablet device 100. Housing 102 can include display assembly 104 for presenting visual content at a display layer (not shown). The visual content that can include visual, still images, as well as icons such as graphical user interface (GUI) that can provide information the user (e.g., text, objects, graphics). Display assembly 104 underlying cover glass 106 can be used to display images using any suitable display technology, such as LCD, LED, OLED, electronic or e-inks, and so on.

Display assembly 104 can include a number of other layers such as a touch sensitive layer providing a mechanism for receiving a tactile event at tablet device 100 using a touch input. In the described embodiment, display assembly 104 is protected by a topmost layer taking the form of transparent cover glass 106 formed of polycarbonate or other appropriate plastic or highly polished glass that fully covers display assembly 104. In some embodiments, a display mask can be applied to, or incorporated within or under cover glass 106. The display mask can be used to accent an unmasked portion of the display used to present visual content and can be used to make less obvious the magnetic attachment feature disposed within housing 102.

Tablet device 100 can include various sensors that can be placed in any number of suitable locations. In one embodiment, sensors 108, 110, 111 can be placed on edge 112 and edge 114, respectively, of tablet device 100. It should be noted, however, that the number of sensors and their placement can be widely varied. Sensors 108, 110, and 11 can take many forms and can be configured to detect any number and type of external stimulus. For example, sensor 108 can take the form of a Hall Effect sensor (HFX) that can detect an external magnetic field and respond by providing a signal to a processor in tablet device 100. The processor can, in turn, respond to the signal from HFX sensor 108 by altering a current operating state of tablet device 100. Similarly, sensor 110 can also be an HFX sensor that can cooperate with HFX sensor 108. It should be noted, however, the sensors 108, 110 can be any sensor (optical, tactile, etc.) and any combination of sensors deemed appropriate. Other sensors can include optical sensors. For example, when tablet device 100 includes an image capture device such as camera 116, then camera 116 can be used to determine if flap 202 is in a closed position. Camera 116 can periodically capture an image and based upon the image, provide information that can be used to determine if flap 202 is in the closed, partially open, or open configuration. For example, a uniformly blank image can indicate that the cover is closed, an image that includes an image of the portion of the cover can indicate that the cover is partially open, and an image that is not blank and does not include the cover can indicate that the cover is fully open. In some instances, using camera 116 can be adverse to battery operation. In those situations, an optical sensor such as ambient light sensor (ALS) 118 can be used to sense an amount of ambient light. Clearly, if flap 202 is covering ALS 118, then ALS will not detect any ambient light and that information can be used to deduce the position of flap 202 with respect to tablet device 100.

Accessory device 200 can take the form foldable cover 200. Foldable cover 200 can have a look and feel that complements that of the tablet device 100 adding to overall look and feel of tablet device 100. Foldable cover 200 can include flap 202. Flap 202 can be formed from a single piece of foldable or pliable material. In some embodiments, flap 202 can also be divided into segments separated from each other by a folding region. In this way, the segments can be folded with respect to each other and tablet device 100 at the folding regions. In one embodiment, flap 202 can be formed of layers of material attached to one another forming a laminate structure. Each layer can take the form of a single piece of material that can have a size and shape in conformance with flap 202. Each layer can also have a size and shape that correspond to only a portion of flap 202. For example, in the case of a segmented flap, a layer of rigid or semi-rigid material about the same size and shape of a segment can be attached to or otherwise associated with the segment. In another example, a layer of rigid or semi-rigid material having a size and shape in accordance with flap 202 can be used to provide foldable cover 200 as a whole with a resilient foundation. It should be noted that the layers can each be formed of materials having desired properties. Flap 202 can also include magnets 204 and 206 detectable by sensors 108 and 110 respectively.

FIG. 2 shows foldable cover 200 in closed configuration. More specifically, flap 202 can be pivotally connected to tablet device 100 by way of a hinge assembly 208. Hinge assembly 208 can include magnets or a magnetically attractable element that creates a magnetic circuit with corresponding magnets in tablet device 100. In this embodiment, the magnetic attachment force between hinge assembly 208 and tablet device 100 can maintain foldable cover 200 and tablet device 100 in a proper orientation and placement vis-a-vis flap 202 and cover glass 106. By proper orientation it is meant that foldable cover 200 can only properly attach to tablet device 100 having flap 202 and cover glass 106 aligned in a mating engagement. The mating arrangement is such that flap 202 covers substantially all of cover glass 106 when flap 202 is placed in contact with cover glass 106 in the closed configuration. In one embodiment, tablet device 100 can include a sensor, or sensors, that can detect whether or not foldable cover 200 is attached to tablet device 100. For example, when the attachment mechanism is magnetic in nature, then the sensor can be a HFX sensor that can detect the presence of a magnetic field from magnets disposed in the hinge assembly. In one embodiment, flap 202 can include magnets positioned in such a way as to be detectable by HFX sensors in tablet device 100 when foldable cover 200 is in the closed configuration or a partially open configuration described below. For example, magnet 204 can be detectable by HFX 108 whereas magnets 206 and 207 can be detectable by HFX sensors 110 and 111, respectively. An arrangement of magnets (or other objects that can be detected by an appropriate sensor) along an edge 114 can facilitate the determination of a spatial relationship between tablet device 100 and flap 202. This is particularly true in those situations where flap 202 is segmented in such a way that at least two segments include at least one detectable object (such as a magnet) each that can be readily detected by corresponding sensors (such as HFX sensors) in tablet device 100. A specific example of a segmented flap is described below with reference to FIG. 3.

FIG. 3 shows a top view of a specific embodiment of foldable cover 300 in the form of segmented cover 300. Segmented cover 300 can include flap 302. In a specific embodiment, flap 302 can be partitioned into a number of segments 304-310 interspersed with thinner, foldable portions 312. Each of the segments 304-310 can include one or more inserts disposed therein. Segments 304-310 can each include inserts that can be used to provide structural support for segmented flap 302. That is, the inserts can provide stiffness to foldable cover 300. Flap 302 can include a number of magnets. For example, segment 304 can include magnet(s) 314, segment 306 can include magnet(s) 316, and segment 308 can include magnet(s) 318. In the described embodiment, the magnets in segmented flap 302 are detectable by sensors in tablet device 100. The sensors in tablet device 100 can cooperate to determine a spatial relationship between cover assembly 300 and tablet device 100 and more particularly, cover glass 106. Cover assembly 300 can pivotally attach to tablet device 100 using hinge assembly 320 that can provide one or more pivots to allow cover assembly 300 to fold over on display assembly 104 while cover assembly 300 is attached to tablet device 100. Hinge assembly 208 can include magnetically attractable elements (such as magnets) disposed with hinge span 322. The magnets can interact with magnetic surface 101 to releasably attach cover assembly 300 and tablet device 100.

Figure 4A:
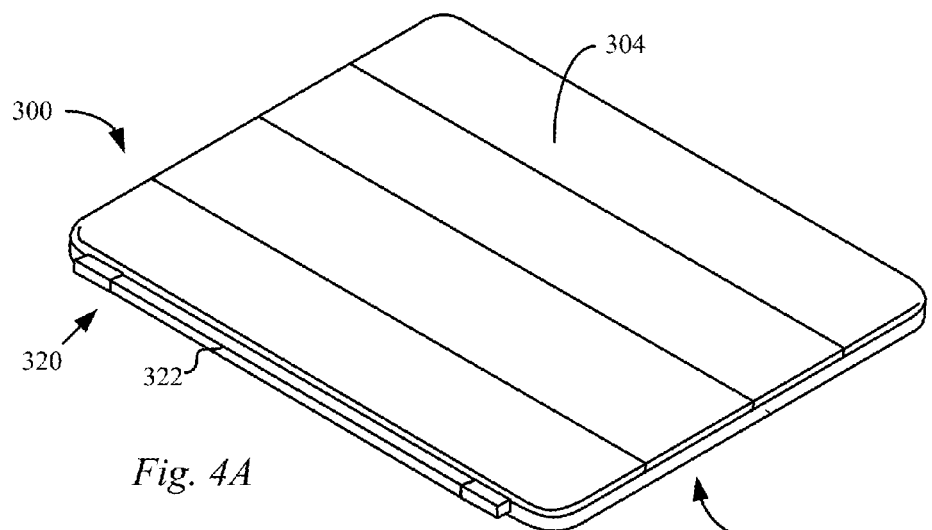
FIGS. 4A-4C shows a foldable cover in varying spatial relationships with respect to tablet device.
Figure 4B:
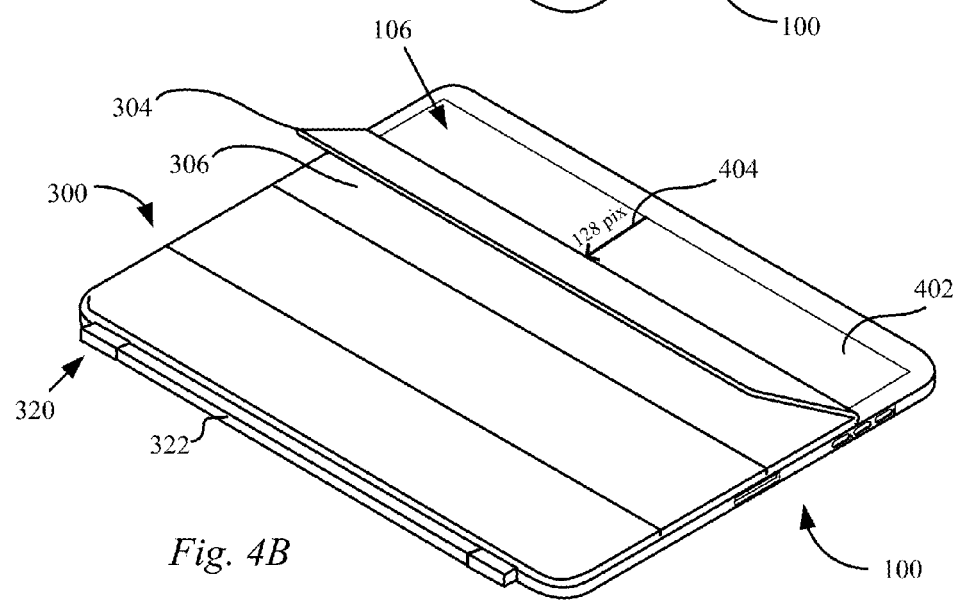
Figure 4C:
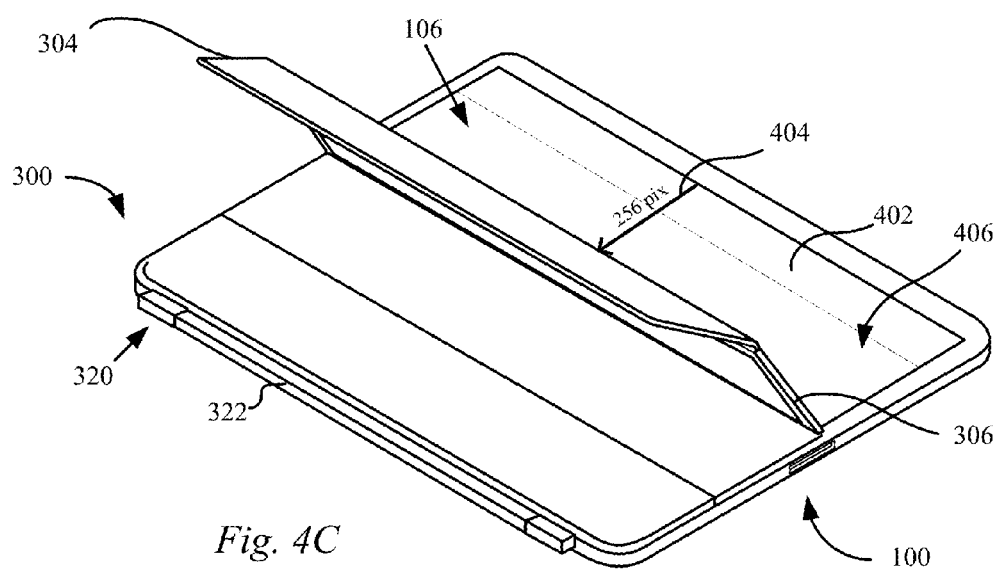

FIGS. 4A-4C shows foldable cover 300 in varying spatial relationships with respect to tablet device 100. For example, FIG. 4A shows foldable cover 300 in the closed configuration completely covering cover glass 106. In this arrangement, tablet device 100 can operate in what can be referred to as standard mode in which in one embodiment, display assembly 104 is not active and does not present any visual content.

However, when segment 304 is lifted from cover glass 106, sensor 108 in tablet device 100 can no longer detect magnet 204 in foldable cover 300. In contrast, sensor 110 can detect magnet 206 since segment 306 remains in contact with cover glass 106 and the magnetic field from magnet 206 remains detectable by sensor 110. In this way, tablet device 100 can evaluate signals from sensors 108 and 110 to deduce that segment 304 and only segment 304 has been lifted from cover glass 106 revealing exposed portion 402. Accordingly, tablet device 100 can change a current operating state to a first peek mode in which display assembly 104 presents visual content only at exposed portion 402. For example, tablet device 100 can display indicator 404 showing an amount of display resources (in this case the number of pixels) available for display. Moreover, as shown in FIG. 4C when segment 306 is not lifted to reveal an additional portion 406 of cover glass 106, neither sensor 108 nor sensor 110 can detect a magnetic field. In this situation, another sensor (such as an optical sensor or an additional HFX sensor) to confirm that only segments 304 and 306 are lifted from cover glass 106. In this case, tablet device 100 can deduce that only segments 304 and 306 are lifted and respond by entering what is referred to as a second peek mode in which extended portion 402 of display assembly 104 presents visual content. In this case, indicator 404 can be modified to reflect the larger amount of display resource (256 pixels) now available for presenting visual content. Hence, information in the form of visual content such as time of day, notes, and so forth can be presented for viewing on only that portion of display viewable.

For example, when Hall Effect sensor 108 detects that cover assembly 300 is in contact with cover glass 106 indicating that the display is not viewable, then the signal sent by Hall Effect sensor 108 can be interpreted by a processor in tablet device 100 to change the current operating state to sleep state. On the other hand, when segment 304 is lifted from cover glass 106, Hall Effect sensor 108 can respond to the removal of the magnetic field from magnet 204 by sending another signal to the processor. The processor can interpret this signal by again altering the current operating state. The altering can include changing the operating state from the sleep state to an active state. In another embodiment, the processor can interpret the signal sent by Hall Effect sensor 108 in conjunction with other sensors by altering the operating state of tablet device 100 to a peek mode in which only that portion of the display exposed by the lifting of segment 304 is activated and capable of displaying visual content and/or receiving (or sending) tactile inputs.

In some cases, when segment 306 is lifted from cover glass 106 at the same time that Hall Effect sensor 108 indicates that segment 304 is also lifted, the presence of sensors in addition to Hall Effect sensor 108 can cause the processor to enter into an extended peek mode in which additional display resources corresponding to the additional exposed portion of the display are also activated. For example, if tablet device 100 includes other sensors (such as optical sensors) that can detect the presence of a particular segment, then signals from Hall Effect sensor 108 in combination with other sensor signals can provide an indication to the processor that a particular portion or portions of the display assembly are currently viewable and can thus be enabled to present visual content.

Figure 5A:
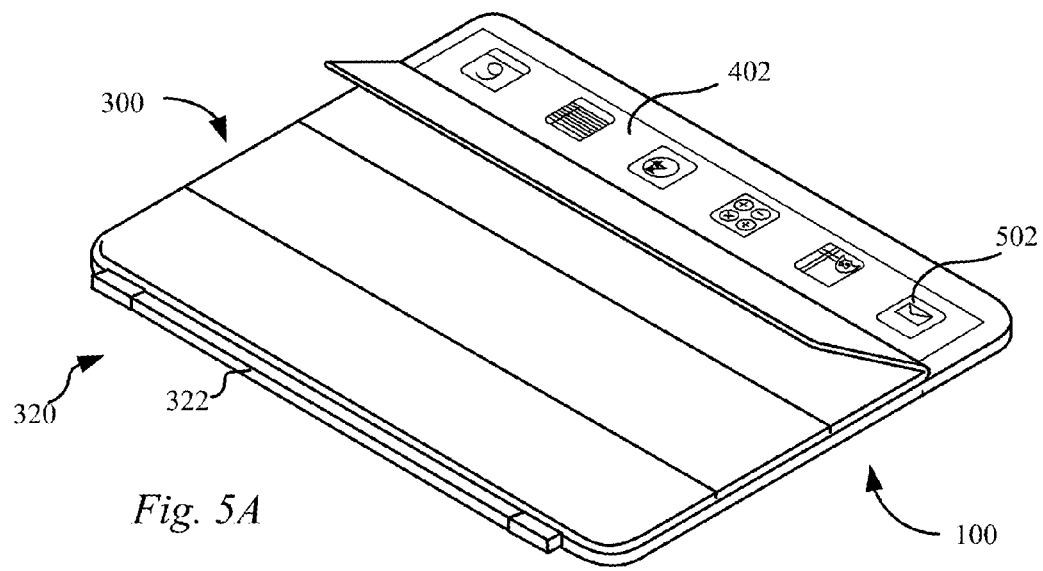
FIG. 5A and FIG. 5B show representative peek mode functionality in accordance with the described embodiments.

Turning now to FIG. 5A, when tablet device 100 has determined that only segment 304 has been lifted, then tablet device 100 can change operating state to "first peek" state in which only the exposed portion 402 of the display actively presents visual content in the form of icons 502. Hence, information in the form of visual content such as time of day, notes, and so forth can be presented for viewing on only that portion of display viewable. Once the sensors detect that segment 304 has been placed back on glass layer 106, tablet device 100 can return to the previous operational state such as a sleep state. Furthermore, in another embodiment, when an icon arranged to respond to a touch is displayed, then that portion of a touch sensitive layer corresponding to the visible portion of the display can also be activated.

Figure 5B:
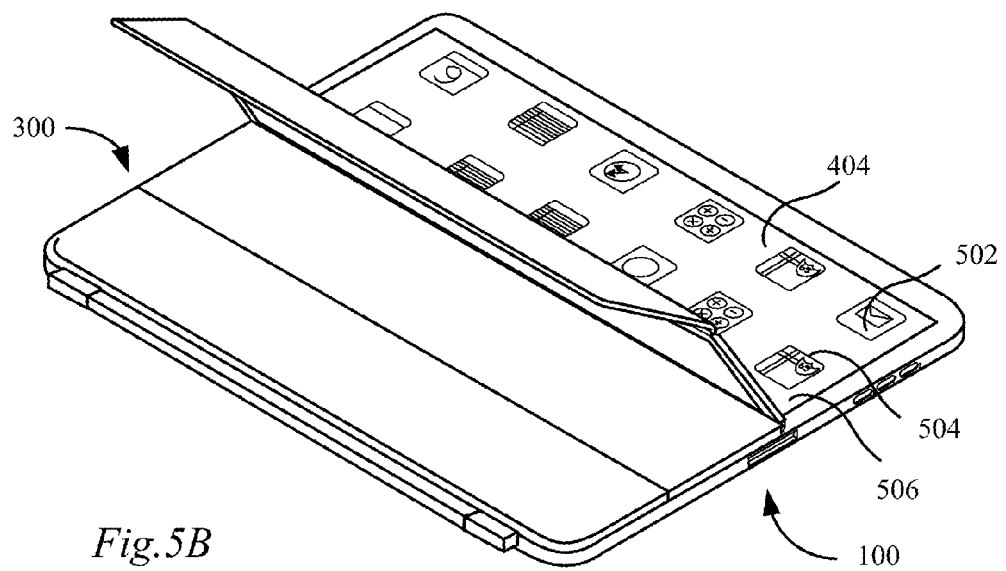

Furthermore, as shown in FIG. 5B, when additional segments (such as segment 306) are lifted from cover glass 106 to further expose portions of cover glass 106, second portion 406 of display assembly 104 can present visual content. In this way, in the "extended" or second peek mode, additional visual information, such as icons 504 (in addition to or in place of icons 502), can be presented in extended portion 506 of display assembly 104. It should be noted that as segments are lifted from cover glass 106, the current operating state of tablet device 100 can change such that additional segments of the display can present visual content.

Figure 6A:
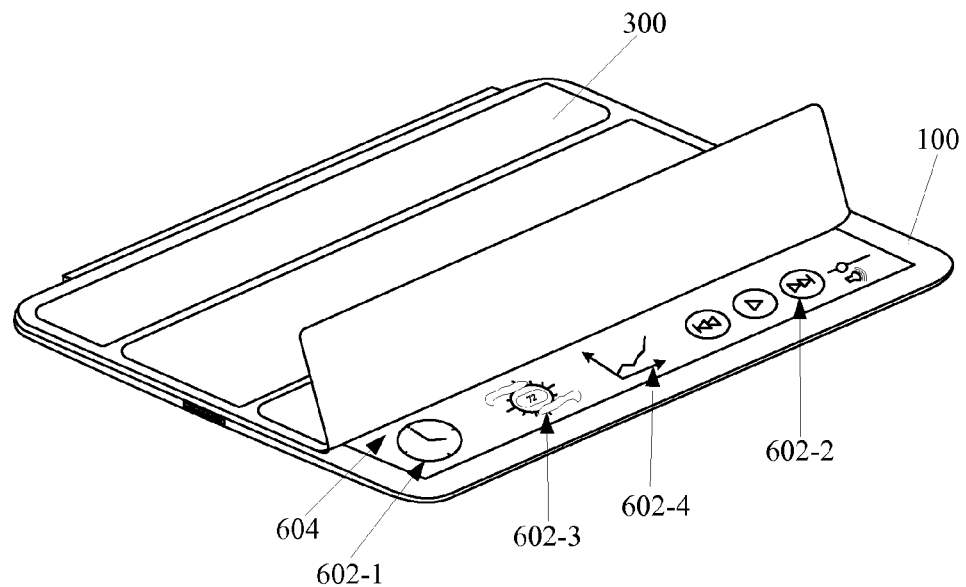
FIG. 6A and FIG. 6B show additional peek mode functionality in accordance with the described embodiments.
Figure 6B:
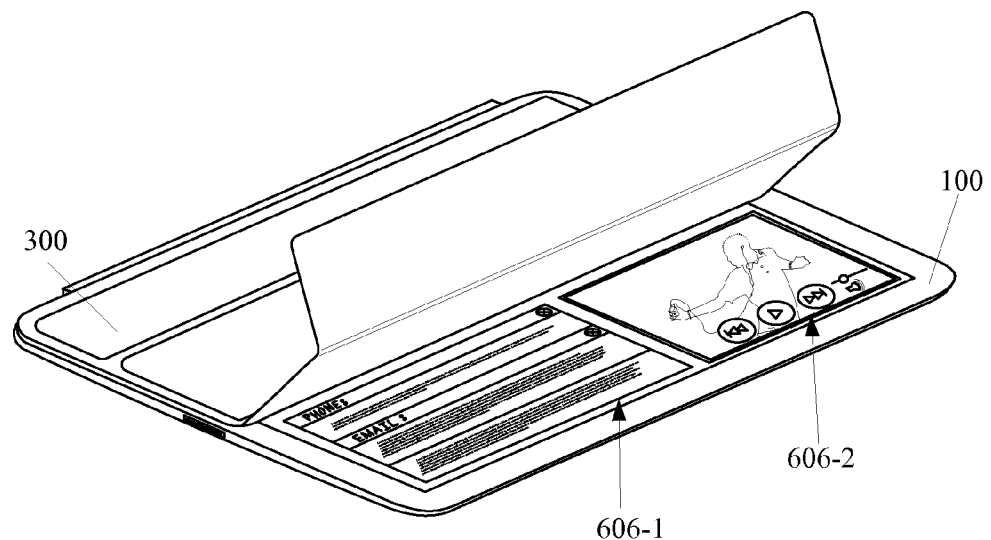

FIG. 6A and FIG. 6B shows a situation where the spatial relationship between foldable cover 300 and tablet device 100 can result in tablet device 100 operating in a peek mode in accordance with the described embodiments. More particularly, FIG. 6A illustrates the spatial relationship between foldable cover 300 and tablet device 100 can cause tablet device 100 to operate in the first peek mode. In the described embodiments, tablet device 100 operates in the first peek mode when segment magnet 206 is not detected by sensor 108 and magnet 204 is detected by sensor 110 indicating that only segment 304 is lifted thereby uncovering portion 402 of cover glass 106. Accordingly, in first peek mode, icons 602 or other visual elements can be displayed only in viewable portion 604 of display assembly 104 of tablet device 100. Icons 602 can be simply display type icons or in some instances, some or all of icons 602 can be user interactive. For example, icon 602-1 can display a clock showing the current time whereas icon 602-2 can represent graphical user interfaces in the form of a control panel used to modify operations of a media player function performed by tablet device 100. Other icons can include, icon 602-3 representing current weather conditions, icon 602-4 representing a stock market result, and so on.

FIG. 6B, on the other hand, illustrates second (or extended) peek mode in which additional functionality can be enabled when it is determined that more than a portion 402 of display assembly 104 is viewable in the form of portion 406 when segment 306 and segment 304 are each lifted. Tablet display 100 can deduce that only segments 304 and 306 are lifted when neither sensor 108 nor 110 can detect magnets 204 and 206. In order to distinguish from the open configuration, a third sensor (possible in the form of an additional HFX sensor) can be used to determine that segment 308 remains in contact with cover glass 106. Therefore, in second peek mode, additional information available in portions of foldable cover 300 in contact with display assembly 104 can cause tablet device 100 to alter its operating state along the lines disclosed. For example, in second peek mode, an additional display area that can be rendered viewable can be used to present video 606-2 (with overlaid user interface 602-2 or equivalent), textual data 606-1 and so on.

It should be noted that tablet device 100 can transition directly from the first peek mode to the open configuration and from the open configuration directly to the first peek mode. In these situations, an application (such as an email application) can be set to display visual information in accordance with the operating state of tablet device 100. For example, if tablet device 100 is in the open configuration and is displaying desktop icons consistent with a standard operating mode, if tablet device 100 determines that foldable cover 300 is now positioned in a manner consistent with the first peek mode, then the email application will immediately transition from the standard mode of operation to a mode of operation in accordance with the first peek mode. For example, the email application can present a full email in the standard mode but can transition to presenting only a subject line (or other visual information) consistent with the available display resources.

Figure 7:
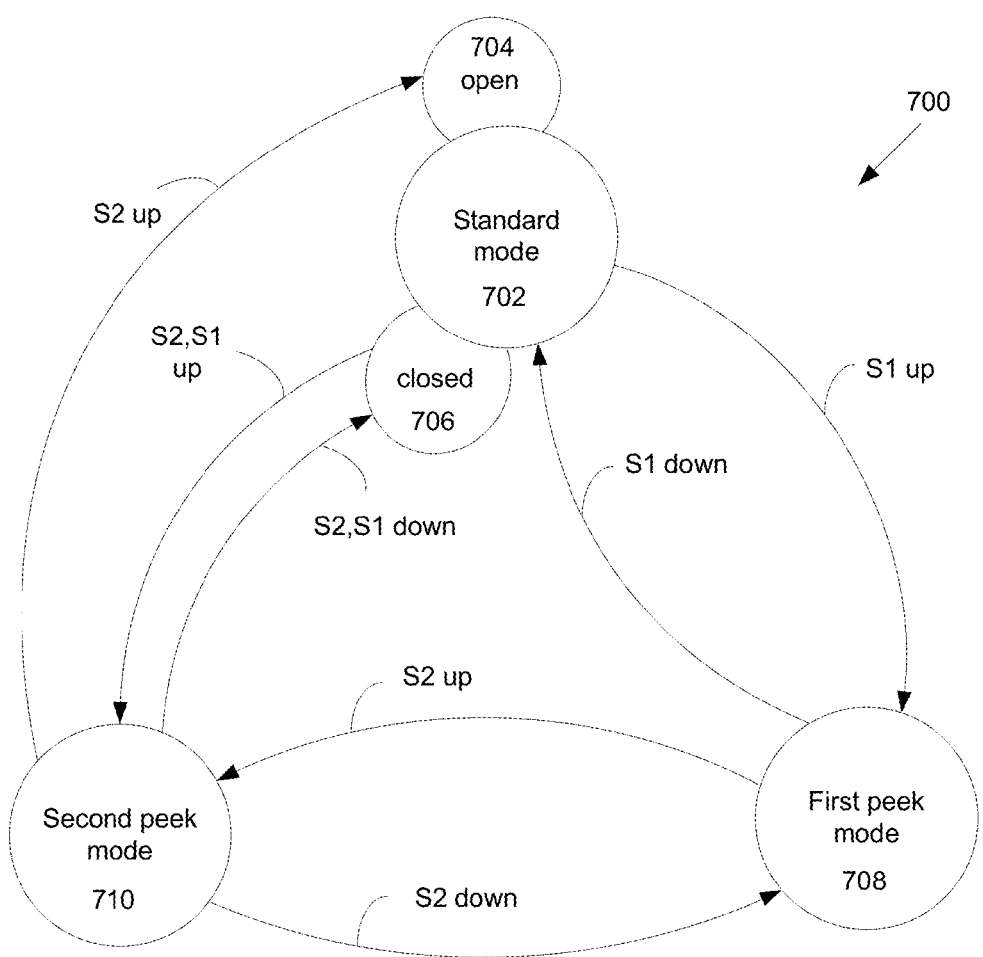
FIG. 7 shows a peek mode state diagram in accordance with the described embodiment.

FIG. 7 shows state peek mode state diagram 700 in accordance with the described embodiments. It should be noted that although peek mode state diagram shows three tablet device operating states (standard, first peek, second peek), the number of operating states can be related in some embodiments to the number of foldable segments. For example, if n represents the number of foldable segments, then there can be n−1 peek modes available (assuming that there are adequate sensor resources for the tablet device). As shown in FIG. 7, tablet device 100 can operate in a standard operating mode at 702 when tablet device 100 determines that foldable cover 300 is in either the open configuration or the closed configuration. In the open configuration (704), display assembly 104 is able to present visual content without restriction. In the closed configuration (706), display assembly 104 is prevented from presenting any visual content (in order to preserve battery resources) since all of cover glass 106 is unviewable.

When tablet device 100 is in the standard mode (702) and segment 304 (represented as "S1") is lifted, then tablet device 100 determines that only segment 304 is lifted and changes to first peek mode operating state (708). In the first peek mode operating state, any visual content presented by display assembly 104 is limited to that portion of display assembly 104 that is determined to be viewable consistent with segment 304 being lifted. In first peek mode, when segment 304 is no longer lifted from tablet device 100, then tablet device 100 returns to standard mode (702) and more particularly, the closed configuration. However, when tablet device 100 is in the first peek mode (708) and segment 306 ("S2") is determined to be lifted by tablet device 100, then tablet device 100 changes to a second peek mode (710). In the second peek mode, visual content is presented by display assembly 104 in only that portion determined to be viewable.

When tablet device 100 determines that segment 306 is not lifted, and then tablet device 100 transitions from the second peek mode to the first peek mode. Also, when tablet device is in the second peek mode and tablet device 100 determines that both segments are not lifted, and then tablet device 100 transitions directly from second peek mode to standard mode consistent with foldable cover being in the closed configuration. Conversely, tablet device 100 can transition directly from the standard mode consistent with the closed configuration when segments 304 and 306 are both lifted concurrently. Also in the second peek mode, tablet device 100 can transition directly to the standard mode consistent with foldable cover being in the open configuration when all remaining segments of foldable cover 300 are lifted.

It should also be noted, that applications can be executed in accordance with the current operating state of tablet device 100. For example, an application running in first peek mode can immediately transition to a second peek mode (and vice versa). In the case of an email application, a full version of an email message can be presented in the standard mode, a smaller version (possibly just a pre-defined summation) in the second peek mode, and only a subject line in the first peek mode. It should be appreciated that a user can provide peek mode settings which can determine how tablet device 100 responds to foldable cover 300 being positioned in a manner consistent with a peek mode.

Figure 8A:
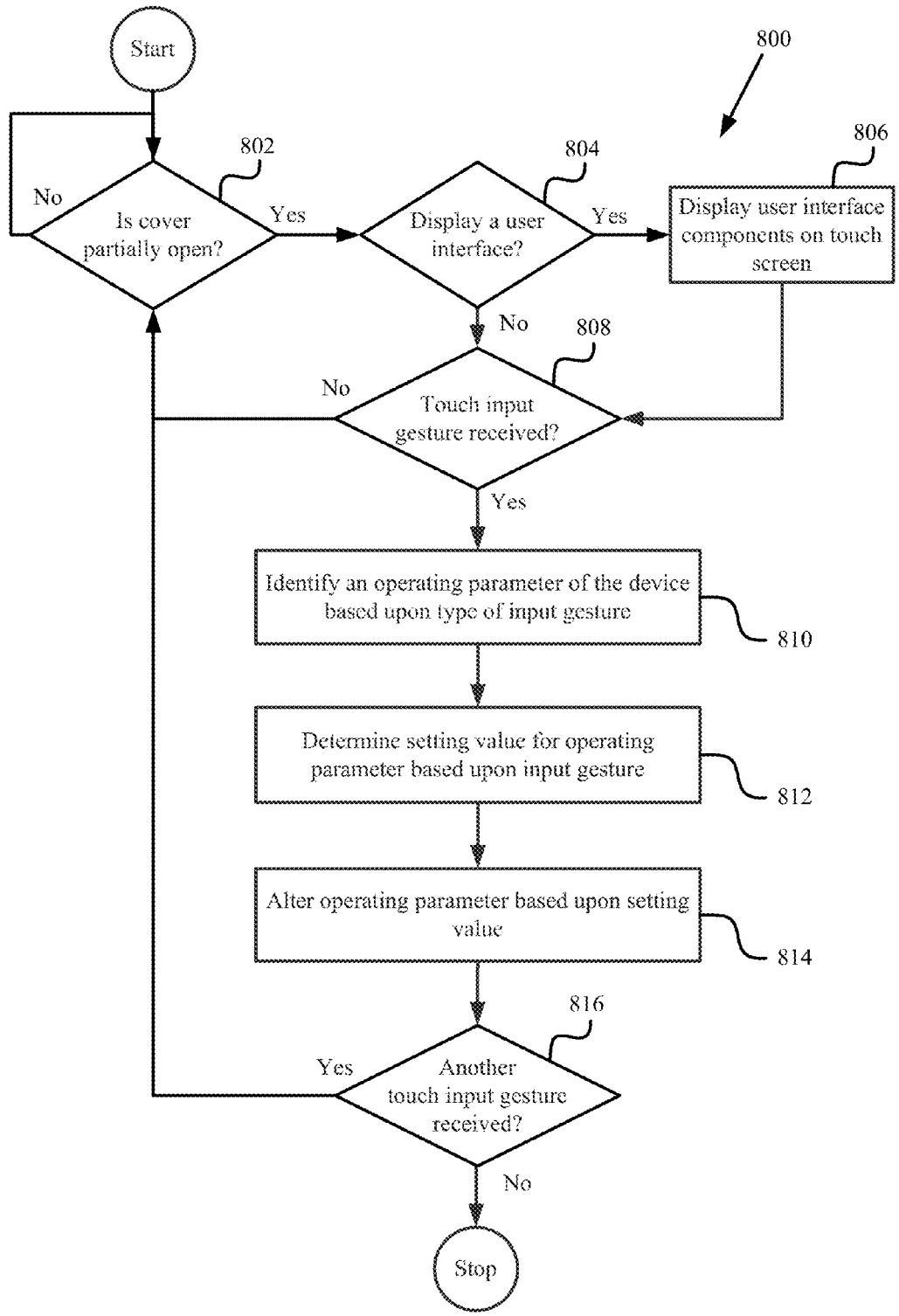
FIG. 8A shows a flowchart detailing a process for adjusting device configuration in accordance with input received in peek mode in accordance with the described embodiments.

FIG. 8A shows a flowchart detailing a process 800 for adjusting device configuration in accordance with input received in peek mode in accordance with the described embodiments. The process 800 begins at block 802, which determines whether the cover is partially open. The partially-open configuration can be detected using the sensor-based techniques described elsewhere herein. Block 804 optionally determines whether to display a user interface in a region of the display screen exposed by the partially open cover. The user interface can be, for example, one of the interfaces 1052, 1062 shown in FIGS. 10C and 10D. In one embodiment, the user interface is not displayed, in which case blocks 804 and 806 are not used. In another embodiment, the user interface is displayed after a period of time has elapsed, e.g., 30 seconds, 60 seconds, or the like, so that the display is not initially activated, thereby saving battery power and providing less intrusive operation in darkness or other situations in which illuminating the display is not desired. In still another embodiment, the user interface is always displayed at block 806, in which case the conditional check at block 804 is not used.

If block 804 determines that the user interface is to be displayed, block 806 displays the user interface components on the touch screen. Block 808 determines whether a touch input gesture has been received. If not, control returns to block 802, and the process waits for a touch input gesture while potentially continuing to check at block 804 whether sufficient time has elapsed to display the user interface. If block 808 determines that touch input has been received, block 810 identifies an operating parameter of the device based upon the type of the input gesture. As described above, a lookup table or other mapping can be queried for the operating parameter that corresponds to a particular input gesture. Block 812 determines a setting value for the operating parameter based upon the input gesture. For example, a magnitude or size of the input gesture can be used to determine a corresponding proportional value for the parameter. Block 814 alters the parameter based upon the determined setting value, e.g., by setting the parameter to the determined setting value. The setting value can be numeric, alphabetic, Boolean, or the like. The illustrated process ends after the value has been set and block 816 determines that no further touch input gesture has been received. Otherwise, if another touch input gesture has been received, block 816 transfers control back to block 802 to repeat the process 800. The process 800 can be repeated as long as the cover is partially open, touch input is received, and, in one embodiment, as long as a predetermined time period has not elapsed since opening of the cover.

Figure 8B:
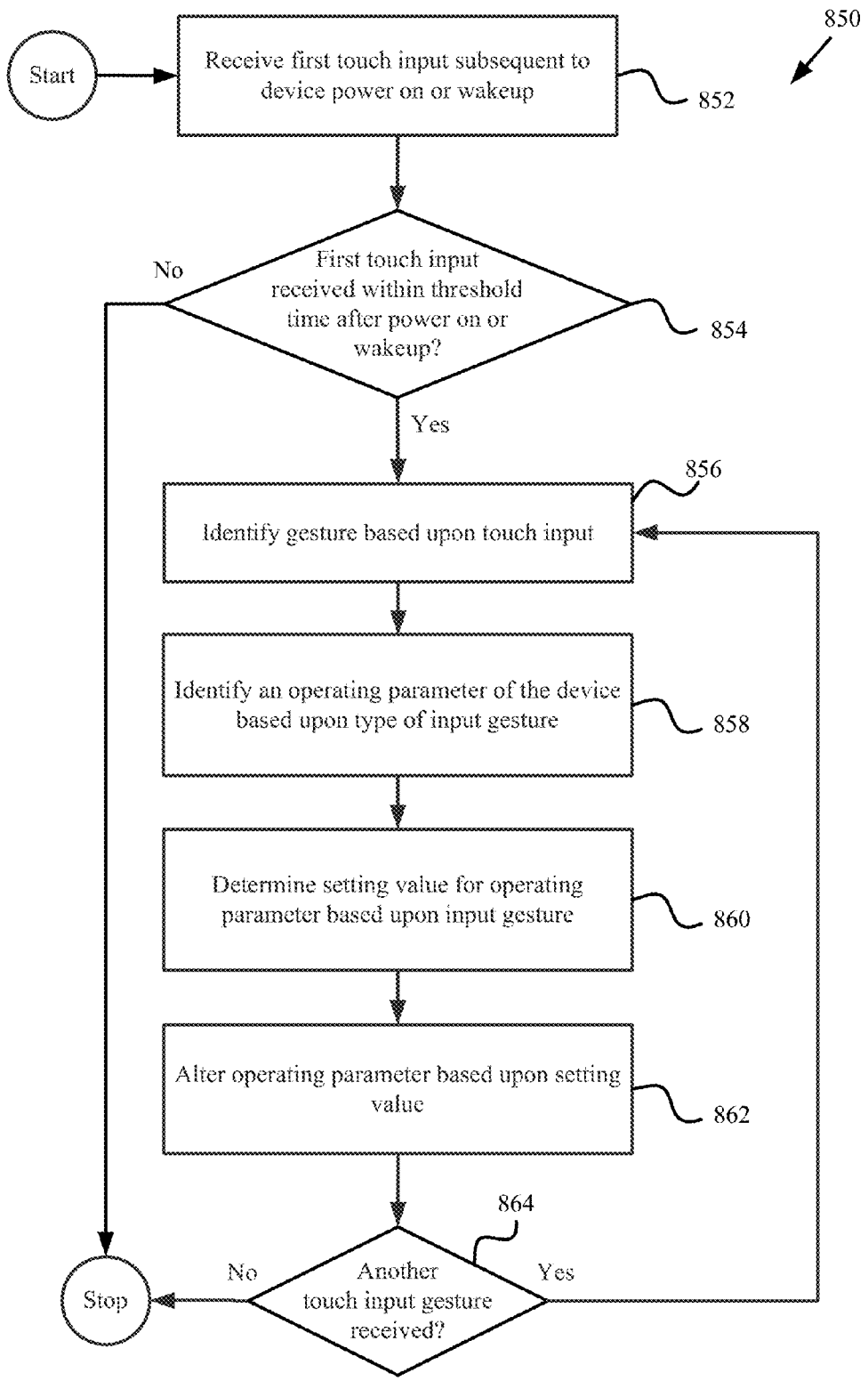
FIG. 8B shows a flowchart detailing a process for adjusting device configuration in accordance with input received within a period of time after a device has been powered on or awoken from sleep mode in accordance with the described embodiments.

FIG. 8B shows a flowchart detailing a process 850 for adjusting device configuration in accordance with input received within a period of time after a device has been powered on or awoken from sleep mode in accordance with the described embodiments. The process 850 begins at block 852 by receiving a first touch input subsequent to a power up (or wakeup) of the device from a powered-off or sleep state. Block 854 determines if the first touch input was received within a threshold time after the power on or wakeup. If not, then the process ends. If such input was received, block 854 identifies a gesture in the input. Block 858 identifies an operating parameter of the device based on the type of input gesture, as described above with reference to FIG. 8A. Block 860 determines a setting value for the operating parameter based upon the input gesture, and block 862 alters the operating parameter, e.g., by setting the parameter to the setting value. Block 864 determines if another touch input gesture has been received, and, if so, transfers control back to block 856 to process the next input gesture. Otherwise, the process ends when block 864 determines that no further input gesture has been received.

Figure 9:
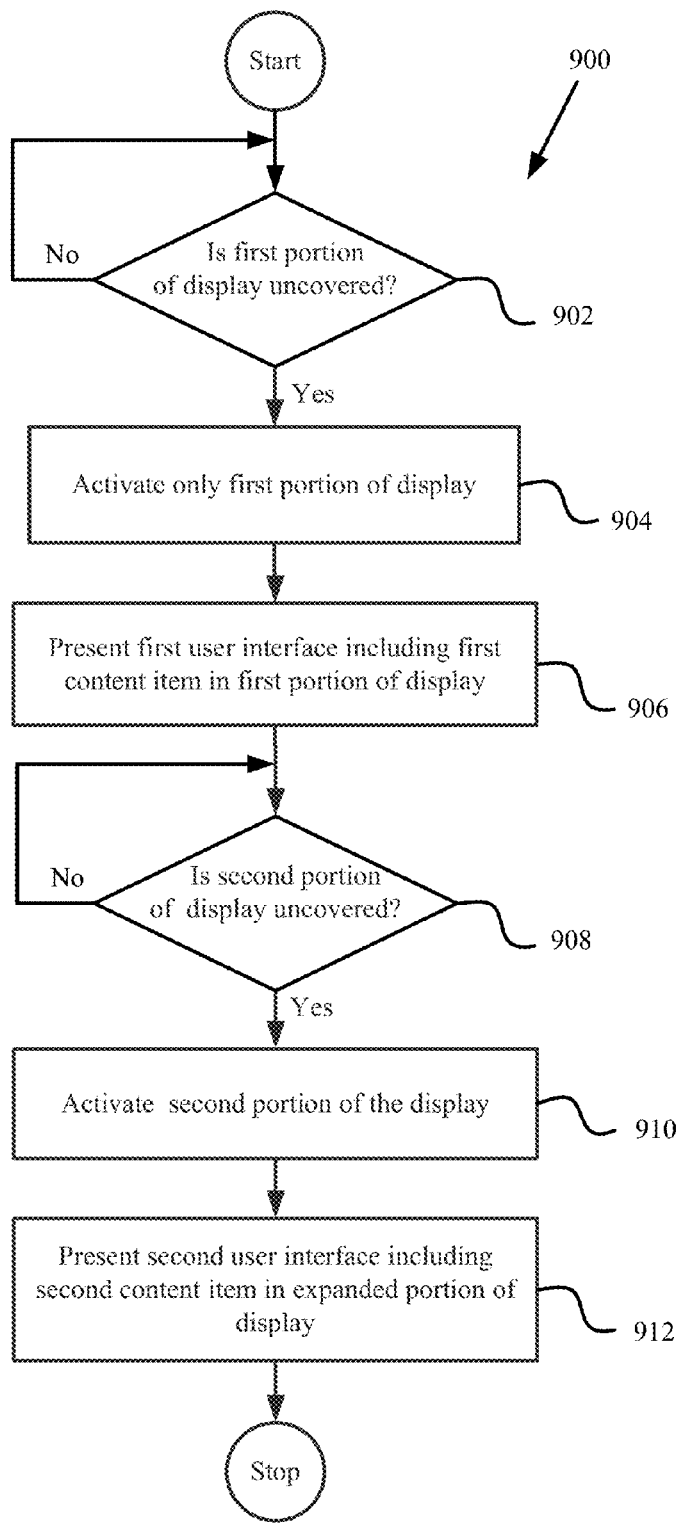
FIG. 9 shows a flowchart detailing a process for presenting different user interfaces in portions of a device display that are exposed in different peek modes.

FIG. 9 shows a flowchart 900 detailing a process for presenting different user interfaces in portions of a device display that are exposed in different peek modes. The process of FIG. 9 begins at block 902 by determining whether a first portion of the display is uncovered. If so, block 904 activates only the first portion of the display, and block 906 presents a first user interface, including a first content item, in a first portion of the display, as described above. Block 908 determines if a second portion of the display has been uncovered, e.g., by a segment of the cover being folded away from the display. If so, block 910 activates a second portion of the display, such as the portion exposed by folding away of the cover. Block 912 presents a second user interface in an expanded portion of the display, which can include both the first portion and the second portion.

Figure 10A:
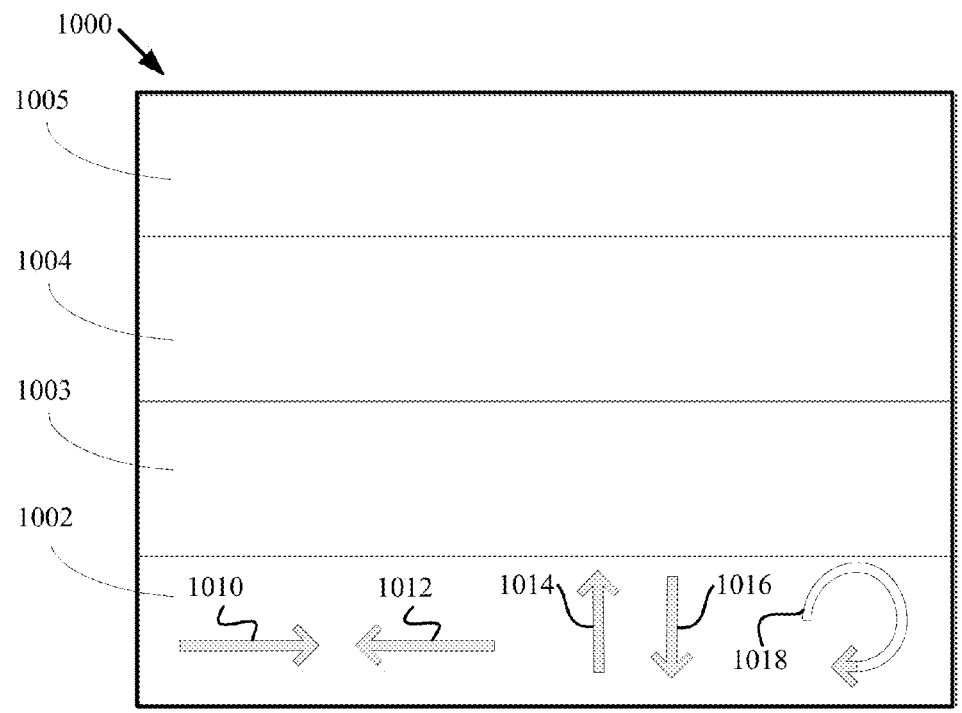
FIGS. 10A and 10B show peek mode input gestures that can set device parameters in accordance with the described embodiments.
Figure 10B:
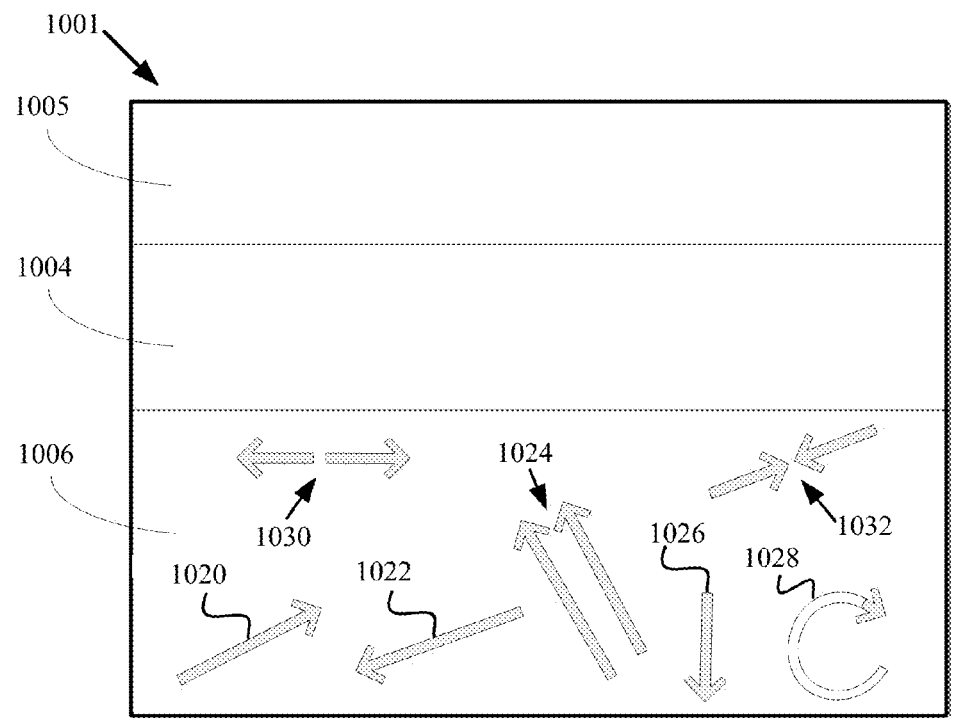

FIGS. 10A and 10B show peek mode input gestures that can set device parameters in accordance with the described embodiments. FIG. 10A shows a first set of gestures 1010-1018, each of which can be associated with an operational parameter and received by a touch input screen. No user interface components are displayed in FIGS. 10A and 10B, so that the display screen can remain dark while touch input is provided, as described above with reference to FIG. 8A. A display 1000 is divided into four logical portions or regions, including a first region 1002, a second region 1003, a third region 1004, and a fourth region 1005. A first segment of the cover corresponding to the first region 1002 has been folded up to expose the first region 1002. A right swipe 1010 on the display screen can, for example, increase a brightness of the screen, and a left swipe 1012 can decrease the brightness of the screen. An upward swipe 1014 can increase the volume of the device's audio output, and a downward swipe 1016 can decrease the volume. A clockwise circular swipe 1018 can set a screen orientation lock to true, so that the orientation of the screen does not change as the device's orientation changes. These associations between gestures and parameters are examples, and other associations are possible. Gestures can be received similarly in other device orientations.

Referring to FIG. 10B, a second segment of the cover corresponding to region 1003 of a display 1001 has been folded up, so that both regions 1002 and 1003 are exposed. The expanded region 1006 included both regions 1002 and 1003. A right upward angled swipe 1020 can increase screen brightness, and a left downward angled swipe 1022 can decrease screen brightness. An upward angled two finger swipe 1024 can, for example, cause functions to be performed such as increasing screen resolution, causing an audio player to advance to a next track, causing the user interface of FIGS. 10A and 10B to be displayed, or the like. A downward swipe 1026 can decrease the device volume. A circular swipe 1028 can toggle the orientation screen lock. A two-finger pinch gesture 1032 can cause the device to shut down and power off A two-finger zoom gesture 1030 can cause the device to switch to a standard operating mode, as if the display were completely uncovered.

Figure 10C:
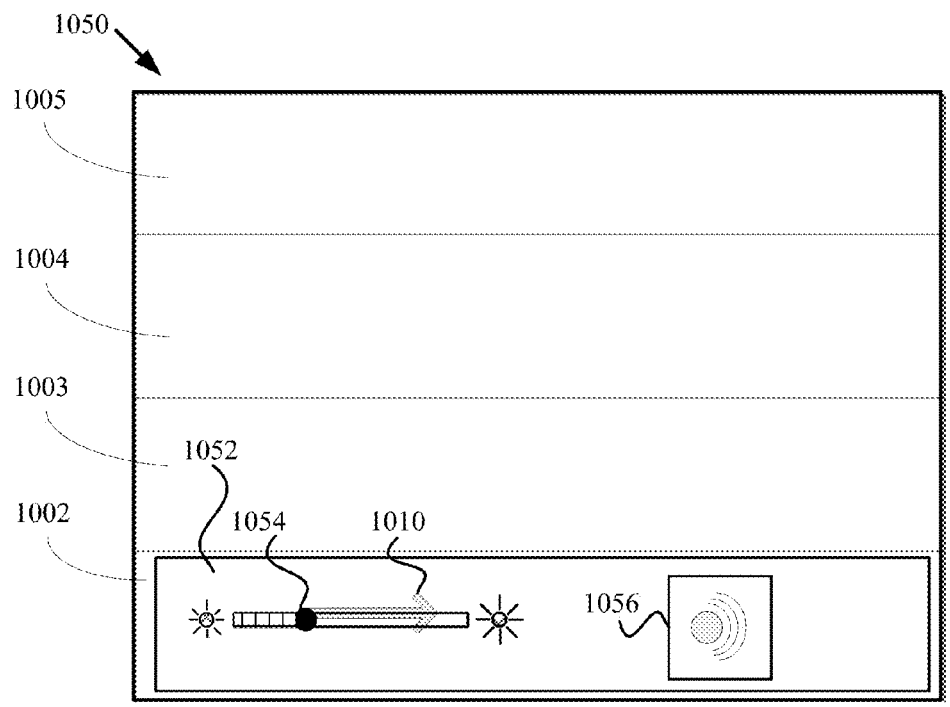
FIGS. 10C and 10D show peek mode user interfaces that can set device parameters in accordance with the described embodiments.
Figure 10D:
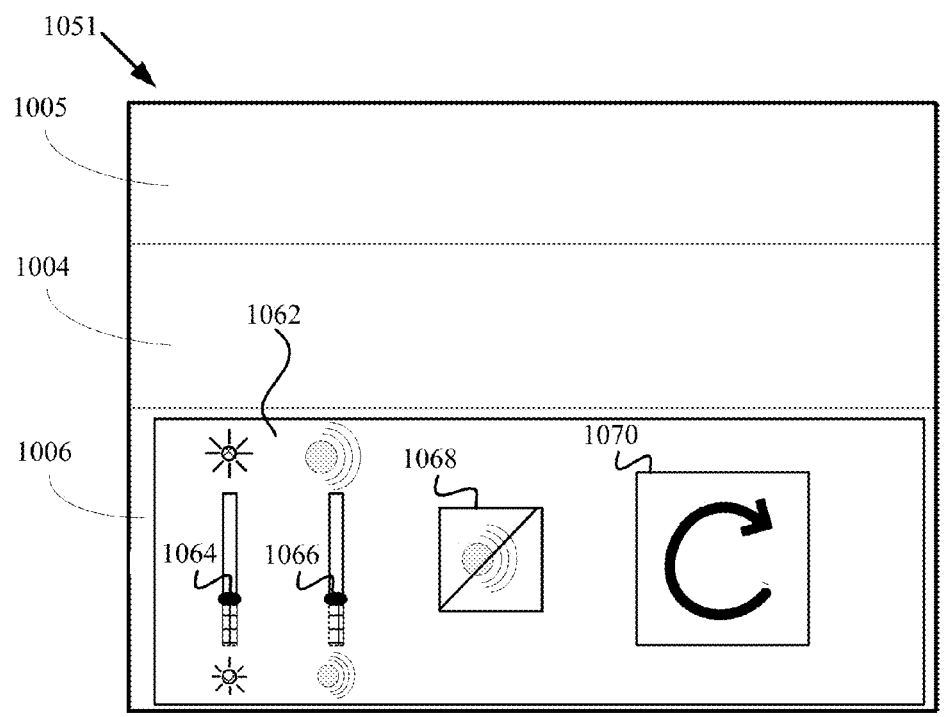

FIGS. 10C and 10D show peek mode user interfaces that can set device parameters in accordance with the described embodiments. In FIG. 10C, a display 1050 has four regions 1002, 1003, 1004, 1005. A first user interface 1052 is displayed in the first region 1002 in response to the first segment of a cover being folded up to expose region 1002. The user interface 1052 includes a brightness control slider 1054, which can be adjusted by user input received from the touch screen. The user input can be a right swipe 1010 that starts on the round slider feature and continues to the right to cause the brightness to increase. An audio mute control 1056 can be tapped by the user to cause the audio to be muted. FIG. 10D shows a display 1051 in which two of the regions have been exposed to form an expanded region 1006. A user interface is displayed in the expanded region 1006. Since the expanded region 1006 is larger than the first region 1002, the second user interface displays additional user interface components and information. A brightness slider 1064 can be used to alter the brightness of the display based on touch input. A volume control slider 1066 can similarly be used to alter the audio volume of the device. A mute control 1068 can mute the device volume and displays a line through the sound icon to indicate that the device volume is muted. An orientation lock control 1070 can toggle the display orientation lock in response to a tap or circular swipe gesture.

Figure 11A:
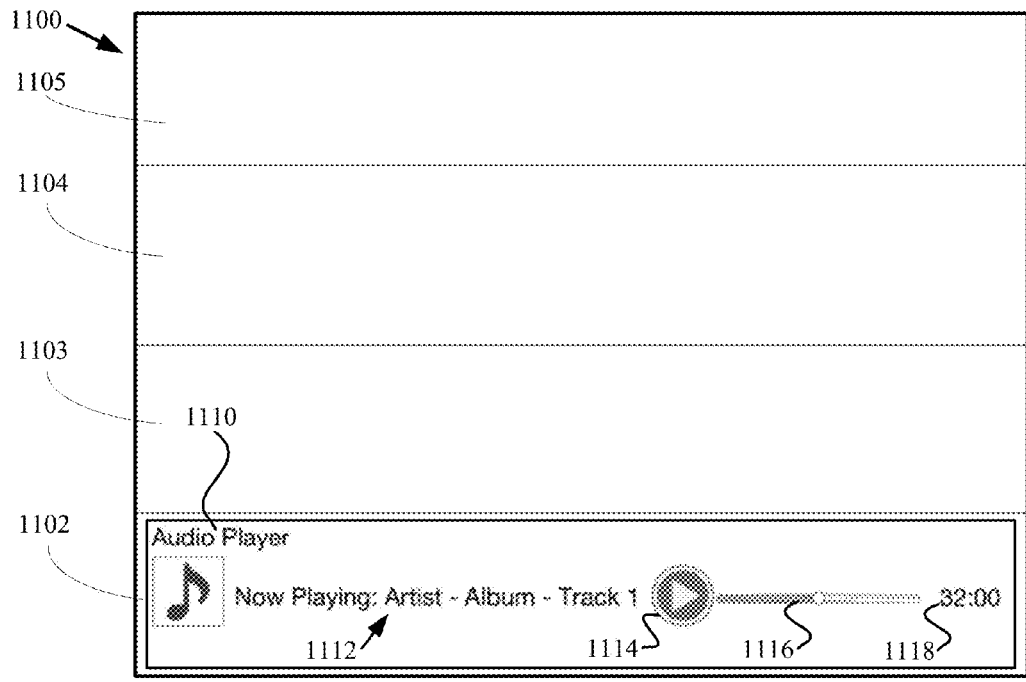
FIGS. 11A and 11B show different audio player user interfaces in different display regions in accordance with the described embodiments.
Figure 11B:
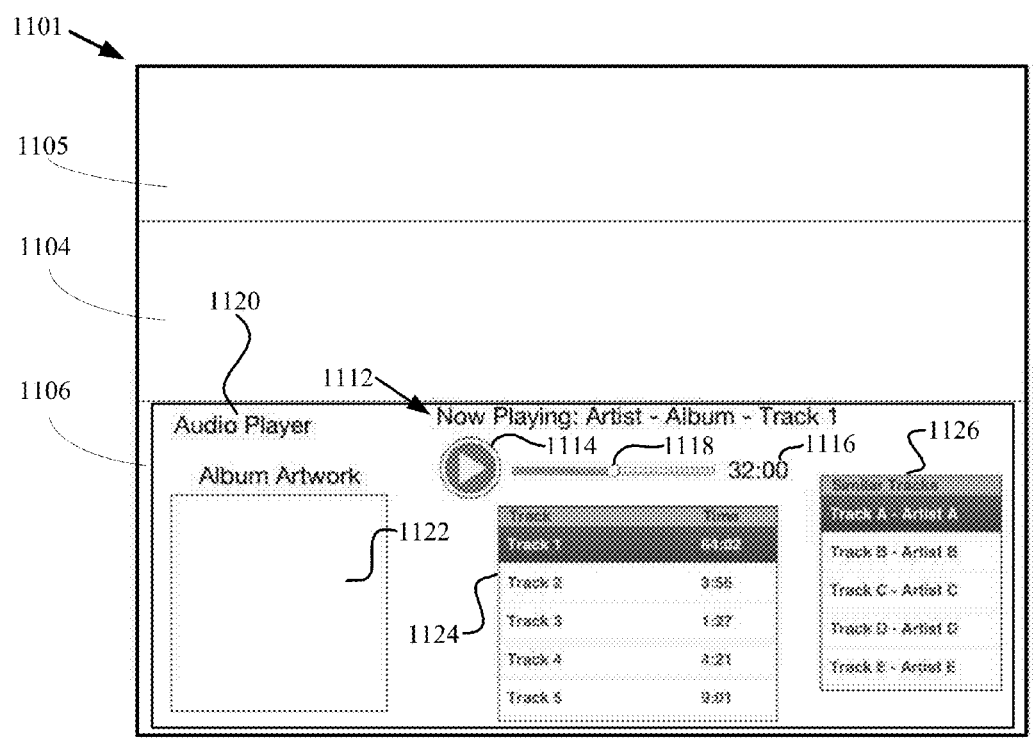

FIGS. 11A and 11B show different audio player user interfaces in different display regions in accordance with the described embodiments. FIG. 11A shows a display 1100, which includes four regions 1102-1105. A first audio player user interface 1110 is displayed in the first region 1102. The first audio player user interface 1110 includes a Now Playing text field 1112, which indicates the name and other information describing a current audio track. A play button 1114 can be tapped to cause the audio to play or pause. A progress bar 1116 shows the percentage of time elapsed and remaining in the current track. A time 1116 indicates the total time of the audio track. FIG. 11B shows a second audio player user interface 1120 displayed in an expanded portion 1106 of the display 1101, which can be displayed when a second segment of a cover is folded up to expose the portion 1106. The second audio player user interface 1120 includes the Now Playing text field 1112, the play button 1114, the slider 1118, and the time 1116. An album artwork image 1122 shows artwork associated the current track. A track list 1124 lists the tracks of the album associated with the current track. A similar track list 1126 lists tracks similar to the current track.

Figure 12A:
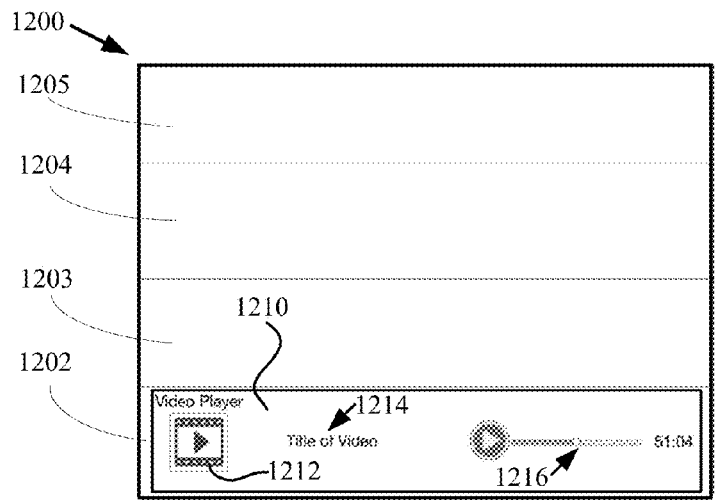
FIGS. 12A-12C show different video player user interfaces in different display regions in accordance with the described embodiments.
Figure 12B:
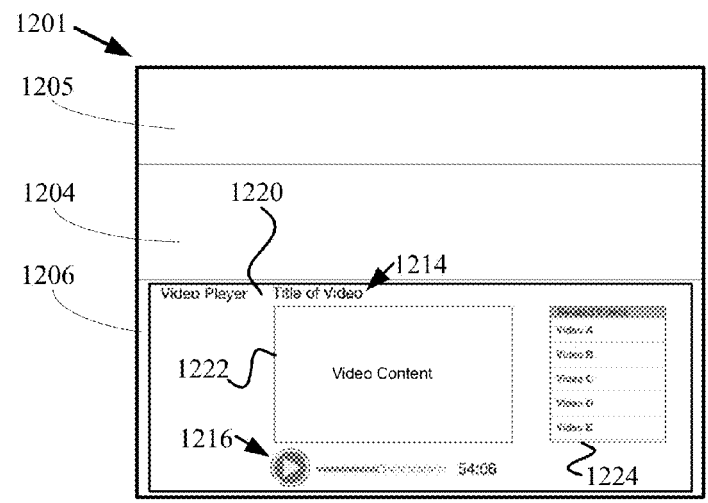
Figure 12C:
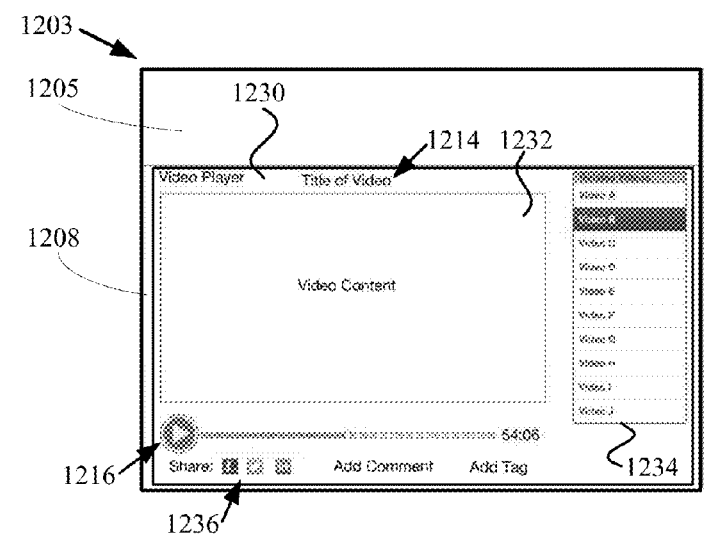

FIGS. 12A-12C show different video player user interfaces in different display regions in accordance with the described embodiments. FIG. 12A shows a display 1200 having four regions 1202-1205. A first video player user interface 1210 is displayed in the first region 1202, e.g., when only a first segment of a cover is lifted or folded up. A video player icon 1212 indicates that the video player is active, and can be tapped to cause a full screen video player or expanded video player user interface to appear. A video title 1214 indicates the title of a video for which the audio track is currently being played. A play button and progress bar 1216 shows the current position in the video. FIG. 12B shows a display 1201 in which two segments of the cover have been lifted or folded up to expose an expanded region 1206. A second user interface 1220 is displayed in the expanded region 1206, including the video title 1214, video content 1222, a related videos list 1224, and player controls 1216. FIG. 12C shows a display 1203 in which three segments of the cover have been lifted or folded up to expose an expanded region 1208. A third user interface 1230 is displayed in the expanded region 1208. The third user interface 1230 includes the video title 1214, an enlarged video display 1232, the playback controls 1216, an expanded related video list 1234, and social network sharing controls 1236.

Figure 13A:
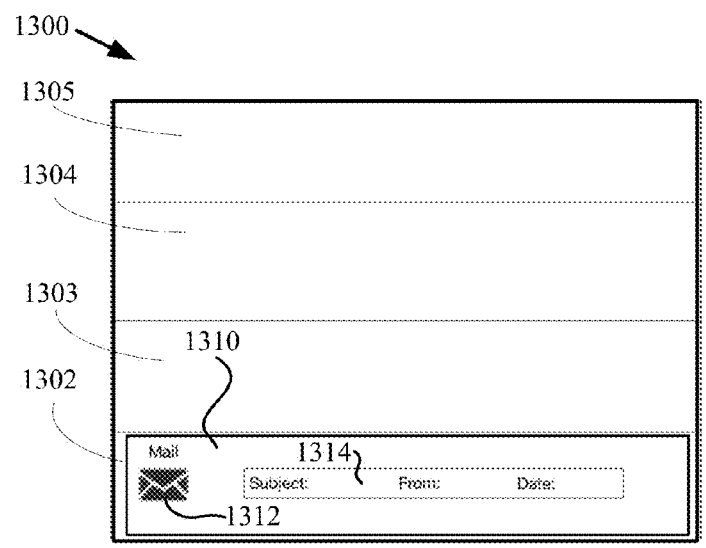
FIGS. 13A-13C show different electronic mail user interfaces in different display regions in accordance with the described embodiments.
Figure 13B:
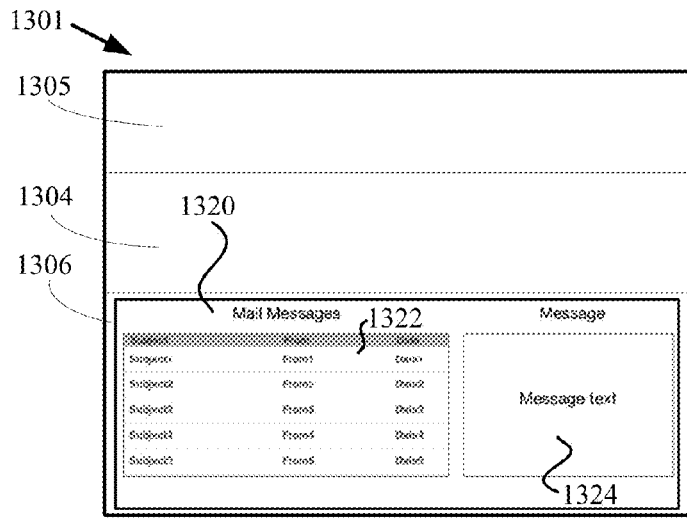
Figure 13C:
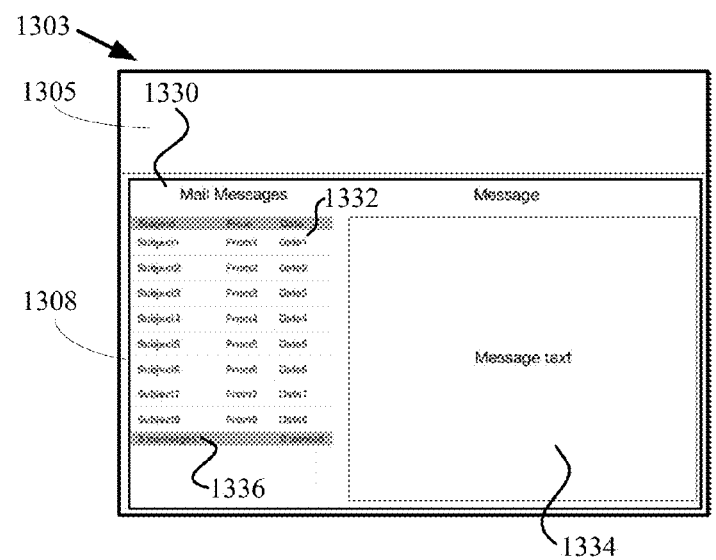

FIGS. 13A-13C show different electronic mail user interfaces in different display regions in accordance with the described embodiments. FIG. 13A shows a display 1300 having four regions 1302-1305. A first email user interface 1310 is displayed in the first region 1302, e.g., when only a first segment of a cover is lifted or folded up. An email icon 1312 indicates that the email user interface is active, and can be tapped to cause a full screen email interface or expanded email interface 1320, 1330 to be displayed. An email header 1314 is displayed in the user interface 1310. FIG. 13B shows a display 1301 presenting a second email user interface 1320 displayed in an expanded region 1306. The second email user interface 1320 includes a list of mail message headers 1322, which can include the header 1314 from the first interface 1310. The second interface 1320 also includes message text 1324 of a selected message. FIG. 13C shows a display 1303 presenting a third email user interface 1330 in a further expanded region 1308. The third email user interface 1330 includes an expanded mail message list 1332, an expanded message text 1334, and summary information 1336 about the message list 1332.

Figure 14:
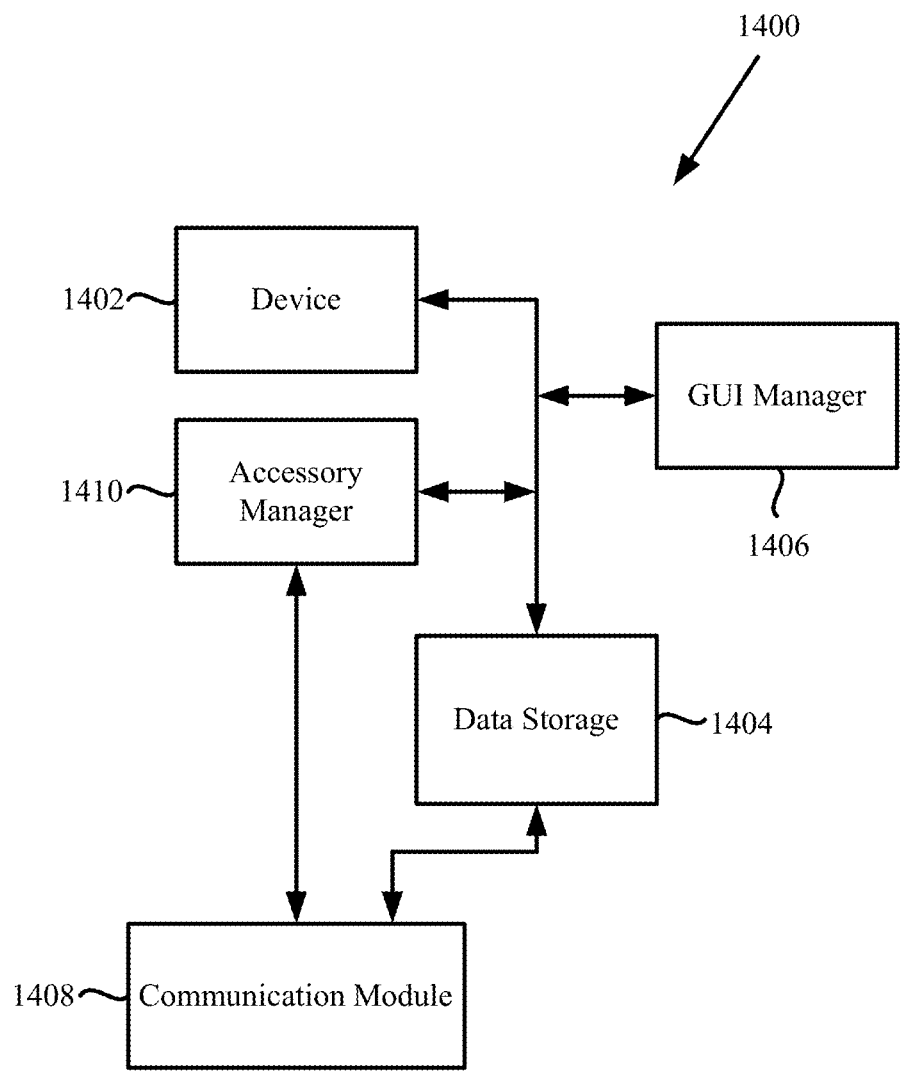
FIG. 14 is a block diagram of an arrangement of functional modules utilized by a portable media device.

FIG. 14 is a block diagram of an arrangement 1400 of functional modules utilized by an electronic device. The electronic device can, for example, be tablet device 100. The arrangement 1400 includes an electronic device 1402 that is able to output media for a user of the portable media device but also store and retrieve data with respect to data storage 1404. The arrangement 1400 also includes a graphical user interface (GUI) manager 1406. The GUI manager 1406 operates to control information being provided to and displayed on a display device. The arrangement 1400 also includes a communication module 1408 that facilitates communication between the portable media device and an accessory device. Still further, the arrangement 1400 includes an accessory manager 1410 that operates to authenticate and acquire data from an accessory device that can be coupled to the portable media device.

Figure 15:
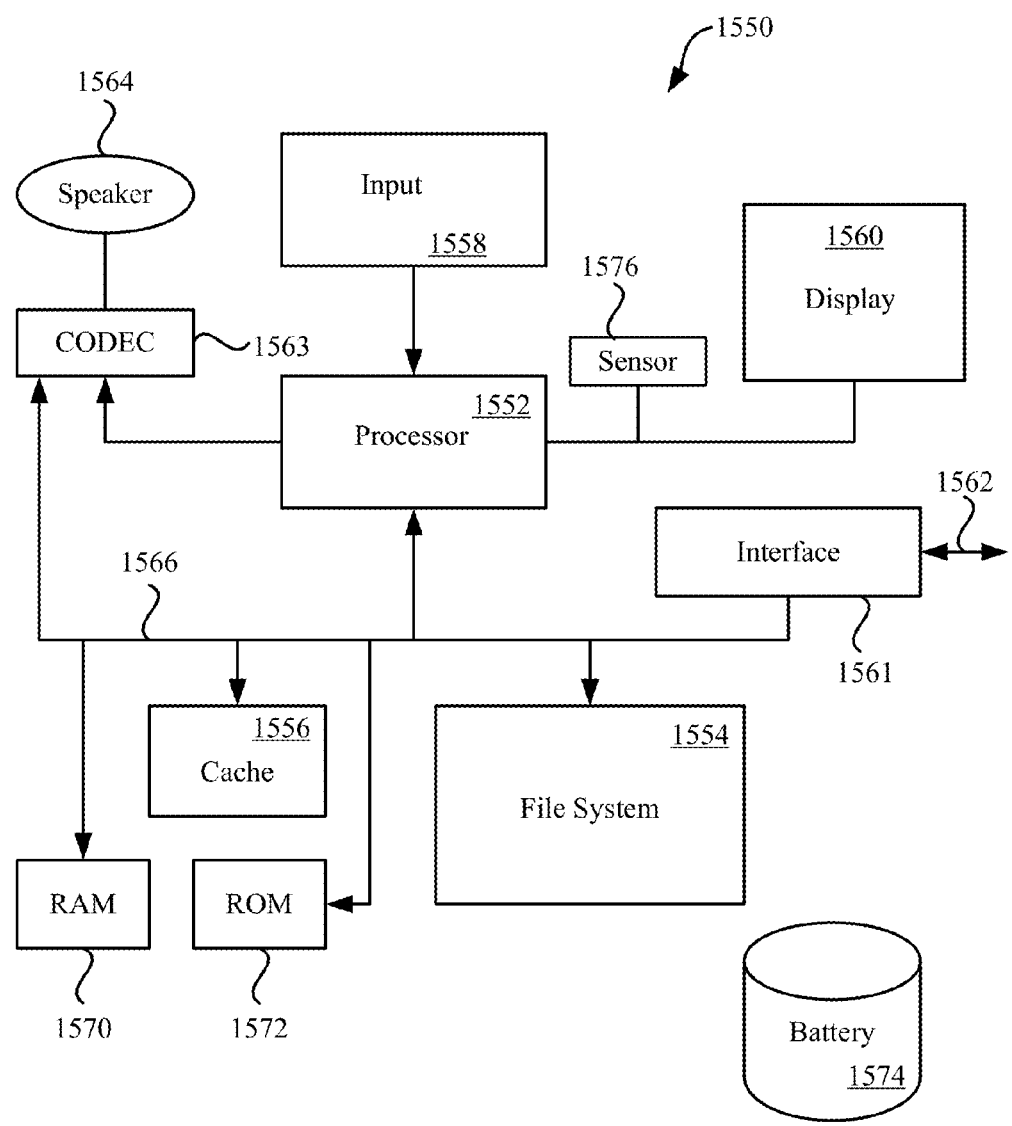
FIG. 15 is a block diagram of an electronic device suitable for use with the described embodiments.

FIG. 15 is a block diagram of an electronic device 1550 suitable for use with the described embodiments. The electronic device 1550 illustrates circuitry of a representative computing device. The electronic device 1550 includes a processor 1552 that pertains to a microprocessor or controller for controlling the overall operation of the electronic device 1550. The electronic device 1550 stores media data pertaining to media items in a file system 1554 and a cache 1556. The file system 1554 is, typically, a storage disk or a plurality of disks. The file system 1554 typically provides high capacity storage capability for the electronic device 1550. However, since the access time to the file system 1554 is relatively slow, the electronic device 1550 can also include a cache 1556. The cache 1556 is, for example, Random-Access Memory (RAM) provided by semiconductor memory. The relative access time to the cache 1556 is substantially shorter than for the file system 1554. However, the cache 1556 does not have the large storage capacity of the file system 1554. Further, the file system 1554, when active, consumes more power than does the cache 1556. The power consumption is often a concern when the electronic device 1550 is a portable media device that is powered by a battery 1574. The electronic device 1550 can also include a RAM 1570 and a Read-Only Memory (ROM) 1572. The ROM 1572 can store programs, utilities or processes to be executed in a non-volatile manner. The RAM 1570 provides volatile data storage, such as for the cache 1556.

The electronic device 1550 also includes a user input device 1558 that allows a user of the electronic device 1550 to interact with the electronic device 1550. For example, the user input device 1558 can take a variety of forms, such as a button, keypad, dial, touch screen, audio input interface, visual/image capture input interface, input in the form of sensor data, etc. Still further, the electronic device 1550 includes a display 1560 (screen display) that can be controlled by the processor 1552 to display information to the user. A data bus 1566 can facilitate data transfer between at least the file system 1554, the cache 1556, the processor 1552, and the CODEC 1563.

In one embodiment, the electronic device 1550 serves to store a plurality of media items (e.g., songs, podcasts, etc.) in the file system 1554. When a user desires to have the electronic device play a particular media item, a list of available media items is displayed on the display 1560. Then, using the user input device 1558, a user can select one of the available media items. The processor 1552, upon receiving a selection of a particular media item, supplies the media data (e.g., audio file) for the particular media item to a coder/decoder (CODEC) 1563. The CODEC 1563 then produces analog output signals for a speaker 1564. The speaker 1564 can be a speaker internal to the electronic device 1550 or external to the electronic device 1550. For example, headphones or earphones that connect to the electronic device 1550 would be considered an external speaker.

The electronic device 1550 also includes a network/bus interface 1561 that couples to a data link 1562. The data link 1562 allows the electronic device 1550 to couple to a host computer or to accessory devices. The data link 1562 can be provided over a wired connection or a wireless connection. In the case of a wireless connection, the network/bus interface 1561 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1576 can take the form of circuitry for detecting any number of stimuli. For example, sensor 1576 can include a Hall Effect sensor responsive to external magnetic field, an audio sensor, a light sensor such as a photometer, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method of using a computing device having a touch screen display for accepting input gestures, the touch screen display having portions capable of being rendered unviewable by an accessory device, the method comprising:
   by a processor of the computing device:
      wherein a first partially open cover configuration comprises the touch screen display having a first unviewable portion and a first viewable portion;
      in the absence of presenting viewable content by the first viewable portion, accepting a first set of input gestures at the first viewable portion, wherein the first set of input gestures control operating parameters of the computing device;
      wherein a second partially open cover configuration comprises the touch screen display having a second unviewable portion and a second viewable portion, the second viewable portion including the first viewable portion; and
      in the absence of presenting viewable content by the second viewable portion, accepting a second set of input gestures at the second viewable portion, wherein the first set of input gestures is a proper subset of the second set of input gestures.

2. The method of claim 1, further comprising:
   determining that the accessory device is in the first partially open cover configuration when a first sensor does not detect a first magnet of the accessory device; and
   determining that the accessory device is in the second partially open cover configuration when a second sensor does not detect a second magnet of the accessory device.

3. The method of claim 1, wherein each input gesture of the first set of input gestures and the second set of input gestures corresponds to a two-dimensional motion over an area of the touch screen display.

4. The method of claim 1, wherein the first set of input gestures includes at least three input gestures and the second set of input gestures includes at least four input gestures.

5. The method of claim 1, wherein the first set of input gestures control operating parameters of the computing device independent of whether an input gesture is received at the touch screen display.

6. The method of claim 1, further comprising:
   determining a time period that has elapsed since a detection of the second partially open cover configuration of the accessory device, wherein the second set of input gestures control operating parameters of the computing device independent of whether an input gesture is received at the touch screen display; and in response to the time period being greater than a threshold value, displaying a user interface having user interface components corresponding to the second set of gestures in the second viewable portion of the touch screen display, the user interface including at least one user interface component corresponding to a parameter adjustment control associated with at least one operating parameter.

7. The method of claim 1, further comprising:
determining that an input gesture of the first set of input gestures is received when the accessory device is in the first partially open cover configuration and the touch screen display is not presenting viewable content.

8. The method of claim 7, further comprising:
receiving the input gesture when the accessory device is in the first partially open cover configuration, wherein the input gesture causes the computing device to display user interface components.

9. The method as in claim 7, further comprising:
using a camera to capture an image;
determining an overall luminance value of the captured image; and
determining that the accessory device is in the first partially open cover configuration when the overall luminance value is less than a threshold luminance value.

10. The method of claim 1, wherein the second viewable portion of the touch screen display presents user interface components in response to receiving an input gesture.

11. The method of claim 1, wherein the first set of input gestures includes an input gesture for locking the computing device and the second set of input gestures includes an input gesture for changing a resolution of the touch screen display.

12. A computing device, comprising:
a touch screen display;
an accessory device;
a processor; and
a memory storing instructions that, when executed by the processor, cause the computing device to perform operations comprising:
wherein a first partially open cover configuration comprises the touch screen display having a first unviewable portion and a first viewable portion;
in the absence of presenting viewable content by the first viewable portion, accepting a first set of input gestures at the first viewable portion, wherein the first set of input gestures control operating parameters of the computing device;
wherein a second partially open cover configuration comprises the touch screen display having a second unviewable portion and a second viewable portion, the second viewable portion including the first viewable portion; and
in the absence of presenting viewable content by the second viewable portion, accepting a second set of input gestures at the second viewable portion, wherein the first set of input gestures is a proper subset of the second set of input gestures.

13. The computing device of claim 12, further comprising:
a first magnet and a second magnet that are each disposed within different foldable flaps of the accessory device; and
a first sensor and a second sensor that are each configured to detect the first magnet and the second magnet, respectively.

14. The computing device of claim 12, wherein the first set of input gestures includes at least three input gestures and the second set of input gestures includes at least four input gestures.

15. The computing device of claim 12, wherein the second viewable portion presents user interface components in response to receiving an input gesture.

16. The computing device of claim 12, wherein the first set of input gestures control operating parameters of the computing device independent of whether an input gesture is received at the touch screen display.

17. A non-transitory computer-readable storage medium configured to store instructions that when executed by a processor in a computing device having a touch screen display and an accessory device, cause the computing device to perform steps that include:
wherein a first partially open cover configuration comprises the touch screen display having a first unviewable portion and a first viewable portion;
in the absence of presenting viewable content by the first viewable portion, accepting a first set of input gestures at the first viewable portion, wherein the first set of input gestures control operating parameters of the computing device;
wherein a second partially open cover configuration comprises the touch screen display having a second unviewable portion and a second viewable portion, the second viewable portion including the first viewable portion; and
in the absence of presenting viewable content by the second viewable portion, accepting a second set of input gestures at the second viewable portion, wherein the first set of input gestures is a proper subset of the second set of input gestures.

18. The non-transitory computer-readable storage medium of claim 17, wherein the steps further include:
determining that the accessory device is in the first partially open cover configuration when a first sensor does not detect a first magnet of the accessory device; and
determining that the accessory device is in the second partially open cover configuration when a second sensor does not detect a second magnet of the accessory device.

19. The non-transitory computer-readable storage medium of claim 18, wherein each input gesture of the first set of input gestures and the second set of input gestures corresponds to a two-dimensional motion over an area of the touch screen display.

20. The non-transitory computer-readable storage medium of claim 17, wherein the first set of input gestures control operating parameters of the computing device independent of whether an input gesture is received at a control element of the touch screen display.

21. The non-transitory computer-readable storage medium of claim 17, wherein the second viewable portion presents user interface components in response to receiving an input gesture.

22. The non-transitory computer-readable storage medium of claim 17, wherein the steps further include:
determining a time period that has elapsed since a detection of the second partially open cover configuration of the accessory device, wherein the second set of input gestures control operating parameters of the computing device independent of whether an input gesture is received at an application interface of the touch screen display; and in response to the time period being greater than a threshold value, displaying a user interface having user interface components corresponding to the second set of gestures in the second viewable portion of the touch screen display, the user interface including at least one parameter adjustment control associated with at least one operating parameter.

* * * * *